US010657481B2

(12) United States Patent
Spencer et al.

(10) Patent No.: US 10,657,481 B2
(45) Date of Patent: *May 19, 2020

(54) EVALUATION OF OUTPUT-PRODUCING ASSET PRODUCTIVITY

(71) Applicant: SPENCERMETRICS LLC, Melville, NY (US)

(72) Inventors: David R. Spencer, Melville, NY (US); Catherine Fiasconaro, Commack, NY (US); Vishal Sahay, New York, NY (US); Yutak Kwok, College Point, NY (US)

(73) Assignee: SPENCERMETRICS LLC, Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,281

(22) Filed: May 23, 2019

(65) Prior Publication Data

US 2019/0279137 A1    Sep. 12, 2019

Related U.S. Application Data

(63) Continuation of application No. 14/685,666, filed on Apr. 14, 2015, now Pat. No. 10,332,057, which is a
(Continued)

(51) Int. Cl.
*G06Q 10/06* (2012.01)

(52) U.S. Cl.
CPC ... *G06Q 10/06395* (2013.01); *G06Q 10/0639* (2013.01)

(58) Field of Classification Search
None
See application file for complete search history.

(56) References Cited

U.S. PATENT DOCUMENTS 5,009,308 A     4/1991  Cullen et al.
5,918,988 A *   7/1999  H.A.M. Van Oijen ......................
                                                    G06F 3/1297
                                                         400/76
(Continued)

FOREIGN PATENT DOCUMENTS

JP      2000259374 A     9/2000
JP      2011002920 A     1/2011

OTHER PUBLICATIONS

International Search Report issued in PCT/US2013/058480, dated Dec. 30, 2013.
(Continued)

*Primary Examiner* — Mehmet Yesildag
(74) *Attorney, Agent, or Firm* — Rossi, Kimms & McDowell LLP

(57) ABSTRACT

Evaluation of output-producing-asset production may be performed at least by incorporating knowledge of operators of the output-producing asset into the generation of values of performance-based metrics for the output-producing asset. Since such knowledge may be only known by the respective operators, mechanisms, such as a graphical user interface ("GUI"), may be provided by which an operator inputs such knowledge and by which such knowledge is incorporated into the generation of values of performance-based metrics for an output-producing asset. A results screen may be generated to display values of performance-based metrics in a configuration that facilitates quick and simple understanding by a decision-maker or other user on how to improve return on the investment ("ROI") in an output-producing asset.

7 Claims, 14 Drawing Sheets

Related U.S. Application Data continuation of application No. PCT/US2013/058480, filed on Sep. 6, 2013.

(60) Provisional application No. 61/714,867, filed on Oct. 17, 2012.

(56) References Cited

U.S. PATENT DOCUMENTS

| | | | |
|---|---|---|---|
| 6,621,596 B1 | 9/2003 | Leisner et al. | |
| 7,953,621 B2* | 5/2011 | Fama | G06Q 10/06 705/7.15 |
| 8,009,308 B2* | 8/2011 | Field | B41F 33/16 358/1.1 |
| 9,785,133 B2* | 10/2017 | Van Camp | G05B 19/042 |
| 2004/0078425 A1* | 4/2004 | Sandfort | H04L 67/22 709/203 |
| 2004/0225397 A1* | 11/2004 | Gotfried | G06Q 10/06398 700/111 |
| 2006/0020509 A1* | 1/2006 | Strain | G06Q 10/109 705/14.25 |
| 2007/0124182 A1* | 5/2007 | Rai | G06Q 10/06 705/7.38 |
| 2007/0263246 A1 | 11/2007 | Bressan et al. | |
| 2008/0004925 A1* | 1/2008 | Bangel | G06Q 10/06313 705/7.23 |
| 2008/0162210 A1* | 7/2008 | Gu | G06Q 10/0637 705/7.41 |
| 2010/0094676 A1* | 4/2010 | Perra | G06Q 10/06 705/7.41 |
| 2011/0270651 A1* | 11/2011 | Bittner | G06Q 10/06 705/7.42 |
| 2014/0358645 A1* | 12/2014 | Ehrman | G06Q 10/06393 705/7.39 |
| 2015/0269512 A1* | 9/2015 | Wartel | G06Q 10/06398 705/7.39 |
| 2015/0310375 A1* | 10/2015 | Dutta | G06Q 10/06398 705/7.42 |

OTHER PUBLICATIONS

Written Opinion issued in PCT/US2013/058480, dated Dec. 30, 2013.
Extended European Search Report issued in European Appln. No. 13847948.0 dated Feb. 25, 2016.
Examination Report issued in European Appln. No. 13847948.0 dated Jan. 3, 2017.
Summons to Attend Oral Proceedings issued in European Appln. No. 13847948.0 dated Dec. 6, 2017.
Brief Communication issued in European Appln. No. 13847948.0 dated May 15, 2018.
Decision to Refuse issued in European Appln. No. 13847948.0 dated Jul. 18, 2018.
Office Action issued in U.S. Appl. No. 14/685,666 dated Aug. 22, 2017.
Office Action issued in U.S. Appl. No. 14/685,666 dated May 1, 2018.
Deitel & Associates, Inc., "Graphical User Interface Concepts: Part 1", http://www.deitel.com/books/vcppnethtp1/vcpphtp1_12.pdf, 2004.
Notice of Allowance issued in U.S. Appl. No. 14/685,666 dated Feb. 4, 2019.

* cited by examiner 406  
1st OPA

| DATE / TIME | EVENT CODE | COMMENTS | ATTACHMENTS |
|---|---|---|---|
| 2013-08-22  8:00 ~410 | Press Startup | | |
| 2013-08-22  8:20 ~414 | Consumables | Toner | |
| 2013-08-22  8:30 | Job Setup - Proof | | |
| ... | Print | | |
| | Delay - Approval | | |
| | Print | | |
| | Quality Control - Artifact | | Quality Control/Artifact/poor_output.jpg |
| | Print | | |
| | Shift End | | |

*FIG. 4*

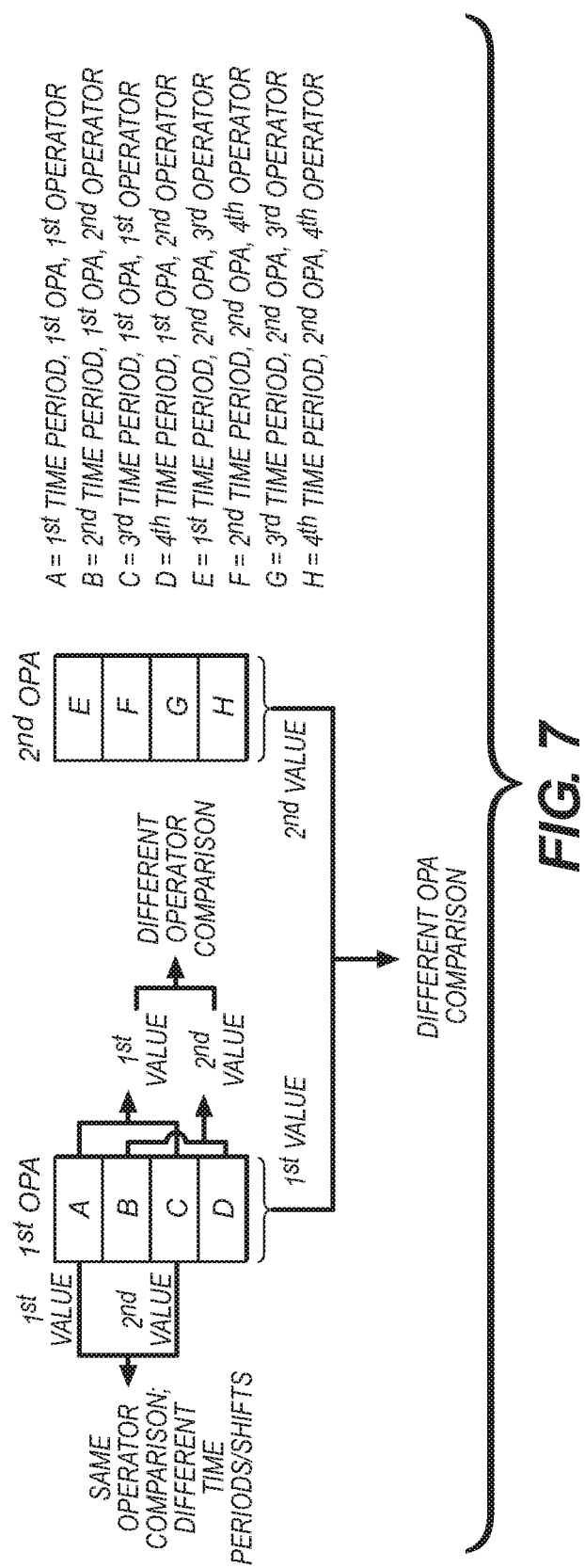

|  | Press A | Press B |
|---|---|---|
| 828 — Productivity | 56.4% | 77.3% |
| 830 — Utilization | 38.7% | 67.0% |
| 832 — Uptime | 70.1% | 80.3% |

| Event | Total Time (Hours) | | Occurances | | Average Time (Minutes) | |
|---|---|---|---|---|---|---|
|  | Press A | Press B | Press A | Press B | Press A | Press B |
| Print | 92.68 | 179.05 | 245 | 251 | 22.7 | 42.8 |
| Repair | 6.87 | 4.17 | 4 | 13 | 103.0 | 19.2 |
| Setup | 15.58 | 0.0 | 243 | 0 | 3.8 | 0 |
| Consumable | 13.63 | 2.85 | 25 | 19 | 32.7 | 9.0 |
| Startup | 11.8 | 0.87 | 20 | 3 | 35.4 | 17.3 |
| Service | 18.12 | 10.15 | 8 | 3 | 135.9 | 203.0 |
| Waiting | 2.32 | 25.75 | 6 | 35 | 23.2 | 44.1 |
| Paper Jam or Web Break | 0.05 | 2.57 | 1 | 36 | 3.0 | 4.3 |
| Maintenance | 3.25 | 1.97 | 4 | 7 | 48.8 | 16.9 |
| Quality | 0.0 | 3.1 | 0 | 3 | 0 | 62.0 |
| Print Waste | 0.0 | 1.27 | 0 | 5 | 0 | 15.2 |
| Idle | 75.2 | 35.53 | 93 | 42 | 48.5 | 50.8 |

*FIG. 8C*

EVALUATION OF OUTPUT-PRODUCING ASSET PRODUCTIVITY

CROSS-REFERENCE TO RELATED APPLICATIONS

This application is a continuation of U.S. application Ser. No. 14/685,666, filed Apr. 14, 2015, which is a continuation of International Application No. PCT/US2013/058480, filed Sep. 6, 2013, which claims priority benefit of U.S. Provisional Application No. 61/714,867, filed Oct. 17, 2012, the entire disclosure of each of the applications cited in this Cross-Reference to Related Applications Section is hereby incorporated herein by reference.

TECHNICAL FIELD

Aspects of this disclosure generally are related to systems and methods for evaluating productivity of one or more output-producing assets, such as printing devices.

BACKGROUND

A printing press is an expensive investment for a company. Accordingly, there is heightened interest in increasing the return on that investment ("ROI"). Conventional techniques exist to measure the state of a printing press or the operational organization of a print shop, but the amount of knowledge available according to such techniques about the printing press is limited and, in some cases, is limited to a particular printing press, a particular workflow, particular types of documents, or even to a particular print shop. Accordingly, a need in the art exists for evaluating the productivity of an output-producing asset based upon additional, relevant information. In addition, although such conventional techniques may provide a user with results regarding press status or workflow deficiencies, a need in the art exists for improving the quality and output of productivity-based-results-information so that decision-makers can more quickly and easily understand how to improve their ROI.

SUMMARY

At least the above-discussed needs are addressed and technical solutions are achieved in the art by various embodiments of the present invention. In some embodiments, a method is executed by a data processing device system comprising a data acquisition device communicatively connected to a processor-accessible memory device system. In some embodiments, the method comprising the steps of receiving operator input via the data acquisition device, the operator input indicating initiation, conclusion, or both initiation and conclusion of a plurality of events associated with an output-producing asset; storing the received operator input in the processor-accessible memory device system; and generating a value of a production-based metric associated with at least some of the plurality of events based at least upon an analysis of at least some of the received operator input. The value of the production-based metric may be stored in the processor-accessible memory device system. The output-producing asset may a printing device, such as a printing press.

At least one of the plurality of events may be associated with a defect in an output from the output-producing asset, an erroneous instruction to the output-producing asset resulting in poor output from the output-producing asset, an operator rest break, an unavailability of output jobs, a staff meeting, a period of time waiting for supervisor approval, or cleanup.

The operator input may indicate initiation, conclusion, or both initiation and conclusion of each of the plurality of events associated with the printing device. In some embodiments, the operator input includes auxiliary information associated with at least one of the plurality of events. The auxiliary information may include commentary, images, or both commentary and images. In some embodiments, the operator input includes information concerning input from the output-producing asset. The operator input may be associated with the same operator or different operators.

The received operator input may be transmitted to the data acquisition device for confirmation. The confirmation may include display of the received operator input at the data acquisition device.

In some embodiments, the method may include the step of receiving a user request, and the generating step may be performed in response to the user request.

In some embodiments, the data acquisition device is communicatively connected to the processor-accessible memory device system over a network via a server device system, and the method may include the step of the data acquisition device transmitting the operator input to the server device system via the network. In embodiments where the data processing device system includes the server device system, the generating step may be performed by the server device system. In embodiments where the data processing device system includes the server device system, the method may further include the step of transmitting the value of the production-based metric to a terminal device communicatively connected to the server device system via the network in a configuration adapted to be displayed at the terminal device, and, in some embodiments, message transmission between the terminal device and the data acquisition device may be facilitated.

In some embodiments, the method further includes sending a message, an email, a text message, or a voice message, in response to occurrence of a condition. The condition may be a receiving of new operator input via the data acquisition device or a change in a state associated with the output-producing asset. The change in the state may be a change to an abnormal state associated with the output-producing asset.

In some embodiments, the method further includes the steps of: receiving asset input from the output-producing asset, the asset input indicating initiation, conclusion, or both initiation and conclusion of a plurality of events associated with the output-producing asset; and storing the received asset input in the processor-accessible memory device system. The asset input may indicate initiation, conclusion, or both initiation and conclusion of each of the plurality of events associated with the output-producing asset. The received asset input may be transmitted to the data acquisition device for confirmation. The confirmation may include display of the received asset input at the data acquisition device. The generating step may include generating the value of the production-based metric based at least upon an analysis of at least some of the received asset input and the received operator input.

In some embodiments, the method further includes the step of providing an indication of a reward for the operator in response to achievement of a threshold amount of a usage-based parameter. The parameter may indicate a number of operator shifts associated with the operator in which the operator has input a threshold amount of operator input.

The production-based metric may indicate a productivity of the output-producing asset, an actual production time of the output-producing asset, a potential production time of the output-producing asset, a utilization of the output-producing asset, an uptime of the output-producing asset, or a duration-based metric associated with at least one of the plurality of events. The production-based metric may be a time-based metric over a user-defined time period.

In some embodiments, the method further includes the step of displaying a results screen displaying the value of the production-based metric. The results screen may be updated, while the results screen is being displayed, in response to occurrence of a condition. The condition may be a receiving of new operator input via the data acquisition device, a change in a state associated with the output-producing asset, or a receiving of a user request for update of the results screen. The change in the state may be a change to an abnormal state associated with the output-producing asset.

The generating step may include generating a respective value for each of a plurality of respective production-based metrics associated with at least some of the plurality of events based at least upon an analysis of at least some of the received operator input. Each of the respective values for each of the plurality of respective production-based metrics may be stored in the processor-accessible memory device system. At least some of the plurality of respective production-based metrics may be fixed.

In some embodiments, the data acquisition device is a first data acquisition device, the plurality of events are a first plurality of events, the output-producing asset is a first output-producing asset, the operator input is first operator input, the value of the production-based metric is a first value of the production-based metric, and the data processing device system comprises a second data acquisition device communicatively connected to the processor-accessible memory device system. In at least some embodiments, the method further includes the steps of: receiving second operator input via the second data acquisition device, the second operator input indicating initiation, conclusion, or both initiation and conclusion of a second plurality of events associated with a second output-producing asset; storing the received second operator input in the processor-accessible memory device system; and generating a second value of the production-based metric associated with at least some of the second plurality of events based at least upon an analysis of at least some of the stored second operator input. The first operator input and the second operator input may be associated with a same operator or different operators. The first value and the second value of the production-based metric may be stored in the processor-accessible memory device system.

In some embodiments, the method further comprises the step of displaying a results screen simultaneously displaying the first value of the production-based metric and the second value of the production-based metric. The results screen may be updated, while the results screen is being displayed, in response to occurrence of a condition. The condition may be a receiving of new operator input via the data acquisition device, a change in a state associated with the output-producing asset, or a receiving of a user request for update of the results screen. The change in the state may be a change to an abnormal state associated with the output-producing asset.

In some embodiments, the generating step includes generating the first value of the production-based metric as a value associated with a first subset of the plurality of events over a first time period based at least upon an analysis of a first subset of the received operator input. In this regard, in some embodiments, the method further comprises the steps of: generating a second value of the production-based metric associated with a second subset of the plurality of events over a second time period based at least upon an analysis of a second subset of the received operator input; and displaying a results screen simultaneously displaying the first value of the production-based metric and the second value of the production-based metric. The first time period, the second time period, or both, may represent(s) an operator shift or a calendar period. The first time period, the second time period, or both, may represent(s) time associated with a particular operator. The results screen may be updated, while the results screen is being displayed, in response to occurrence of a condition. The condition may be a receiving of new operator input via the data acquisition device, a change in a state associated with the output-producing asset, or a receiving of a user request for update of the results screen. The change in the state may be a change to an abnormal state associated with the output-producing asset.

In some embodiments, another method is executed by a data processing device system comprising a data acquisition device system communicatively connected to a processor-accessible memory device system, and this other method may comprise the steps of: receiving input via the data acquisition device system, the input indicating initiation, conclusion, or both initiation and conclusion of a plurality of events associated with at least one output-producing asset; storing the received input in the processor-accessible memory device system; generating a first value of a production-based metric associated with at least some of the plurality of events based at least upon an analysis of at least some of the received input; and generating a second value of the production-based metric associated with at least some of the plurality of events based at least upon an analysis of at least some of the received input. This other method may further include the step of displaying a results screen simultaneously displaying the first value of the production-based metric and the second value of the production-based metric.

The first value of the production-based metric may be associated with a first subset of the plurality of events associated with an operator, and the second value of the production-based metric may be associated with a second subset of the plurality of events associated with the operator. On the other hand, in some embodiments, the first value of the production-based metric is associated with a first subset of the plurality of events associated with a first operator, and the second value of the production-based metric is associated with a second subset of the plurality of events associated with a second operator other than the first operator.

In some embodiments, the at least one output-producing asset includes a first output-producing asset and a second output-producing asset, wherein the first value of the production-based metric is associated with a first subset of the plurality of events associated with the first output-producing asset, and wherein the second value of the production-based metric is associated with a second subset of the plurality of events associated with the second output-producing asset.

In some embodiments, the at least one output-producing asset includes a first output-producing asset, wherein the first value of the production-based metric is associated with a first subset of the plurality of events associated with the first output-producing asset, and wherein the second value of the production-based metric is associated with a second subset of the plurality of events associated with the first output-producing asset. In some embodiments, an indication of a reward may be provided for a user in response to the second value of the production-based metric showing improvement over the first value of the production-based metric by a threshold amount.

In some embodiments, the at least one output-producing asset includes a plurality of output-producing assets, wherein the first value of the production-based metric is associated with a first subset of the plurality of events associated with a first subset of the plurality of output-producing assets of one type, and wherein the second value of the production-based metric is associated with a second subset of the plurality of events associated with a second subset of the plurality of output-producing assets of another type. The first subset of the plurality of output-producing assets of the one type may operate in a first region, and wherein the second subset of the plurality of output-producing assets of the other type may operate in a second region different than the first region.

In some embodiments, the at least one output-producing asset includes a plurality of output-producing assets, wherein the first value of the production-based metric is associated with a first output-producing asset, and wherein the second value of the production-based metric is associated with a plurality of other output-producing assets besides the first output-producing asset. The second value of the production-based metric may be an average of values of the production-based metrics associated with the plurality of other output-producing assets.

Any of the features of any of the methods discussed herein may be combined with any of the other features of any of the methods discussed in herein. In addition, a computer program product may be provided that comprises program code portions for performing some or all of any of the methods and associated features thereof described herein, when the computer program product is executed by a computer or other computing device or device system. Such a computer program product may be stored on one or more computer-readable storage mediums.

For example, in some embodiments, a computer-readable data storage medium system comprises one or more computer-readable data storage mediums storing a program executable by one or more data processing devices of a data processing device system communicatively connected to an input-output device system, the program comprising: receiving instructions configured to cause reception of operator input via the input-output device system, the operator input indicating initiation, conclusion, or both initiation and conclusion of a plurality of events associated with an output-producing asset; storing instructions configured to cause storage of the received operator input in a processor-accessible memory device system; and generating instructions configured to cause generation of a value of a production-based metric associated with at least some of the plurality of events based at least upon an analysis of at least some of the received operator input.

For another example, in some embodiments, a computer-readable data storage medium system comprises one or more computer-readable data storage mediums storing a program executable by one or more data processing devices of a data processing device system communicatively connected to an input-output device system, the program comprising: receiving instructions configured to cause reception of input via the input-output device system, the input indicating initiation, conclusion, or both initiation and conclusion of a plurality of events associated with at least one output-producing asset; storing instructions configured to cause storage of the received input in a processor-accessible memory device system; and generating instructions configured to cause (a) generation of a first value of a production-based metric associated with at least some of the plurality of events based at least upon an analysis of at least some of the received input, and (b) generation of a second value of the production-based metric associated with at least some of the plurality of events based at least upon an analysis of at least some of the received input.

In some embodiments, each of any or all of the computer-readable data storage medium systems described herein is a non-transitory computer-readable data storage medium system including one or more non-transitory computer-readable storage mediums storing the respective program(s).

Further, any or all of the methods and associated features thereof discussed herein may be implemented as all or part of a device system or apparatus.

For example, in some embodiments, an output-producing asset productivity evaluation device system comprises: a data processing device system; an input-output device system communicatively connected to the data processing device system; and a processor-accessible memory device system communicatively connected to the data processing device system and storing a program executable by the data processing device system, the program comprising: receiving instructions configured to cause reception of operator input via the input-output device system, the operator input indicating initiation, conclusion, or both initiation and conclusion of a plurality of events associated with an output-producing asset; storing instructions configured to cause storage of the received operator input in the processor-accessible memory device system; and generating instructions configured to cause generation of a value of a production-based metric associated with at least some of the plurality of events based at least upon an analysis of at least some of the received operator input.

For another example, in some embodiments, an output-producing asset productivity evaluation device system comprises: a data processing device system; an input-output device system communicatively connected to the data processing device system; and a processor-accessible memory device system communicatively connected to the data processing device system and storing a program executable by the data processing device system, wherein the data processing device system is configured by the program at least to: receive operator input via the input-output device system, the operator input indicating initiation, conclusion, or both initiation and conclusion of a plurality of events associated with an output-producing asset; store the received operator input in the processor-accessible memory device system; and generate a value of a production-based metric associated with at least some of the plurality of events based at least upon an analysis of at least some of the received operator input.

For yet another example, in some embodiments, an output-producing asset productivity evaluation device system comprises: a data processing device system; an input-output device system communicatively connected to the data processing device system; and a processor-accessible memory device system communicatively connected to the data processing device system and storing a program executable by the data processing device system, the program comprising: receiving instructions configured to cause reception of input via the input-output device system, the input indicating initiation, conclusion, or both initiation and conclusion of a plurality of events associated with at least one output-producing asset; storing instructions configured to cause storage of the received input in the processor-accessible memory device system; and generating instructions configured to cause (a) generation of a first value of a production-based metric associated with at least some of the plurality of events based at least upon an analysis of at least some of the received input, and (b) generation of a second value of the production-based metric associated with at least some of the plurality of events based at least upon an analysis of at least some of the received input.

For still yet another example, in some embodiments, an output-producing asset productivity evaluation device system comprises: a data processing device system; an input-output device system communicatively connected to the data processing device system; and a processor-accessible memory device system communicatively connected to the data processing device system and storing a program executable by the data processing device system, wherein the data processing device system is configured by the program at least to: receive input via the input-output device system, the input indicating initiation, conclusion, or both initiation and conclusion of a plurality of events associated with at least one output-producing asset; store the received input in the processor-accessible memory device system; and generate (a) a first value of a production-based metric associated with at least some of the plurality of events based at least upon an analysis of at least some of the received input, and (b) a second value of the production-based metric associated with at least some of the plurality of events based at least upon an analysis of at least some of the received input.

Various systems may include combinations or subsets of all the systems and associated features thereof described herein.

BRIEF DESCRIPTION OF THE DRAWINGS

It is to be understood that the attached drawings are for purposes of illustrating aspects of various embodiments and may include elements that are not to scale.

FIG. 4 illustrates operator input, which may be input via the user interface of FIG. 3, according to some embodiments of the present invention;

FIG. 7 illustrates the generation of values of at least one production-based metric for operator or output-producing asset comparisons, according to some embodiments of the present invention;

FIGS. 8A-8C illustrate a single comparison results screen (e.g., all of FIGS. 8A-8C may be displayed as a single results screen, where a user may scroll the results screen down from FIG. 8A to FIG. 8B to FIG. 8C, and back up again as needed, depending upon available screen real-estate) comparing values of production-based metrics for different output-producing assets, according to some embodiments of the present invention;

DETAILED DESCRIPTION

Figure 1:
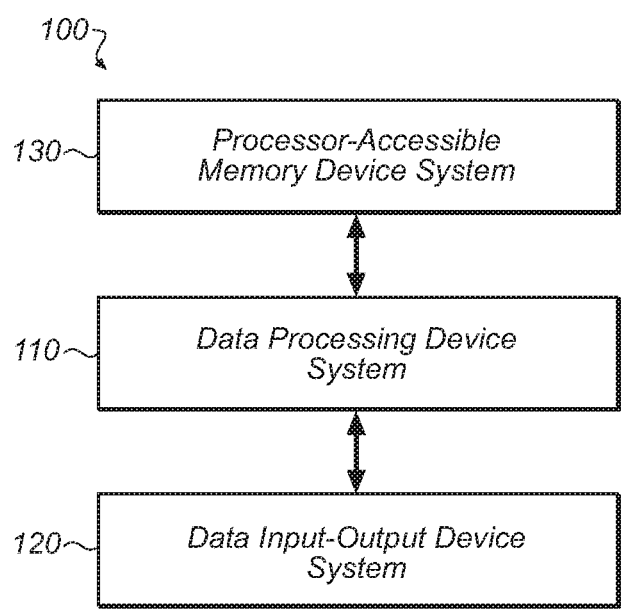
FIG. 1 illustrates a system configured to evaluate productivity of at least one output-producing asset, according to some embodiments of the present invention.

At least some embodiments of the present invention improve upon the evaluation of output-producing-asset production at least by incorporating knowledge of operators of the output-producing asset into the generation of values of performance-based metrics for the output-producing asset. For example, in the case where an output-producing asset is a digital printing press, and when attempting to identify a percentage of time that the digital printing press spends generating sellable or usable output, it is beneficial to know whether or not print jobs printed by the digital printing press were considered waste by the operator, for instance, due to failing to achieve minimum appearance or quality standards. Or, it may be beneficial to know whether a print job failure was due to a mechanical error associated with the press or due to an operational error not due to any problem with the press. Such information may be only known by the operator and, therefore, embodiments of the present invention provide mechanisms by which an operator provides such information and by which such information is incorporated into the generation of values of performance-based metrics for an output-producing asset.

At least some embodiments of the present invention improve upon the evaluation of output-producing-asset production at least by generating and displaying results screens that display values of performance-based metrics in a configuration that facilitates quick and simple understanding by a decision-maker or other user on how to improve return on investment (ROI).

In at least some embodiments where an output-producing asset is a digital printing press, systems and methods are provided for measuring, storing, analyzing, and displaying output press productivity along with the other activities that take the press time. For example, some embodiments of the present invention provide systems and methods that incorporate the human element along with specific knowledge of digital printing, to allow intelligent, real-time acquisition of the duration of each press-related activity (e.g., event) of the potential time—the time that the press could be producing usable output—and how that time is spent. By measuring, identifying, and categorizing those segments, some embodiments of the present invention accumulate the ongoing productive and non-productive time, and analyze how that time is spent.

According to some embodiments, systems and methods may measure all of the activities of a printing press, drilling down to capture important data, some of which may only be known by the operators, and may store, analyze that data in multiple ways, and display those analytical results with clear graphics as well as information. Management, consultants, and even press manufacturers can quickly see from a results screen on a display what are the potential bottlenecks to higher press productivity.

In some embodiments, the system architecture may be cloud-based, and may incorporate a basic device (e.g., thin client) connected to the World-Wide-Web (web), such as a tablet, to perform data capture, and another basic device connected to the web via the Internet, such as a computer, tablet, or smartphone, to provide the information display—anytime, anywhere. It should be noted, however, that the invention is not limited to any of these or other particular embodiments described herein, which are provided merely for illustration purposes.

In the descriptions herein, certain specific details are set forth in order to provide a thorough understanding of various embodiments of the invention. However, one skilled in the art will understand that the invention may be practiced at a more general level without these details. In other instances, well-known structures have not been shown or described in detail to avoid unnecessarily obscuring descriptions of various embodiments of the invention.

Reference throughout this specification to "one embodiment" or "an embodiment" or "an example embodiment" or "an illustrated embodiment" or "a particular embodiment" and the like means that a particular feature, structure or characteristic described in connection with the embodiment is included in at least one embodiment. Thus, the appearances of the phrases "in one embodiment" or "in an embodiment" or "in an example embodiment" or "in this illustrated embodiment" or "in this particular embodiment" and the like in various places throughout this specification are not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more, and the word "subset" is intended to mean a set having the same or fewer elements of those present in the subset's parent or superset.

Further, the phrase "at least" is used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least upon A' includes A as well as the possibility of one or more other additional elements besides A. In the same manner, the phrase, 'based upon A' includes A, as well as the possibility of one or more other additional elements besides A. However, the phrase, 'based only upon A' includes only A. Similarly, the phrase 'configured at least to A' includes a configuration to perform A, as well as the possibility of one or more other additional actions besides A. In the same manner, the phrase 'configure to A' includes a configuration to perform A, as well as the possibility of one or more other additional actions besides A. However, the phrase, 'configured only to A' means a configuration to perform only A.

The term "program" in this disclosure should be interpreted as a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 212, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). The word "module" may be defined as a set of instructions.

The word "device" and the phrase "device system" both are intended to include one or more physical devices or sub-devices (e.g., pieces of equipment) that interact to perform one or more functions, regardless of whether such devices or sub-devices are located within a same housing or different housings. In this regard, the word "device", may equivalently be referred to as a "device system".

Further, the phrase "in response to" may be used in this disclosure. For example, this phrase might be used in the following context, where an event A occurs in response to the occurrence of an event B. In this regard, such phrase includes, for example, that at least the occurrence of the event B causes or triggers the event A.

FIG. 1 schematically illustrates a production-based-evaluation system 100, according to some embodiments of the present invention. The system 100 may include a data processing device system 110, an input-output device system 120, and a processor-accessible memory device system 130. The processor-accessible memory device system 130 and the input-output device system 120 are communicatively connected to the data processing device system 110.

Figure 11:
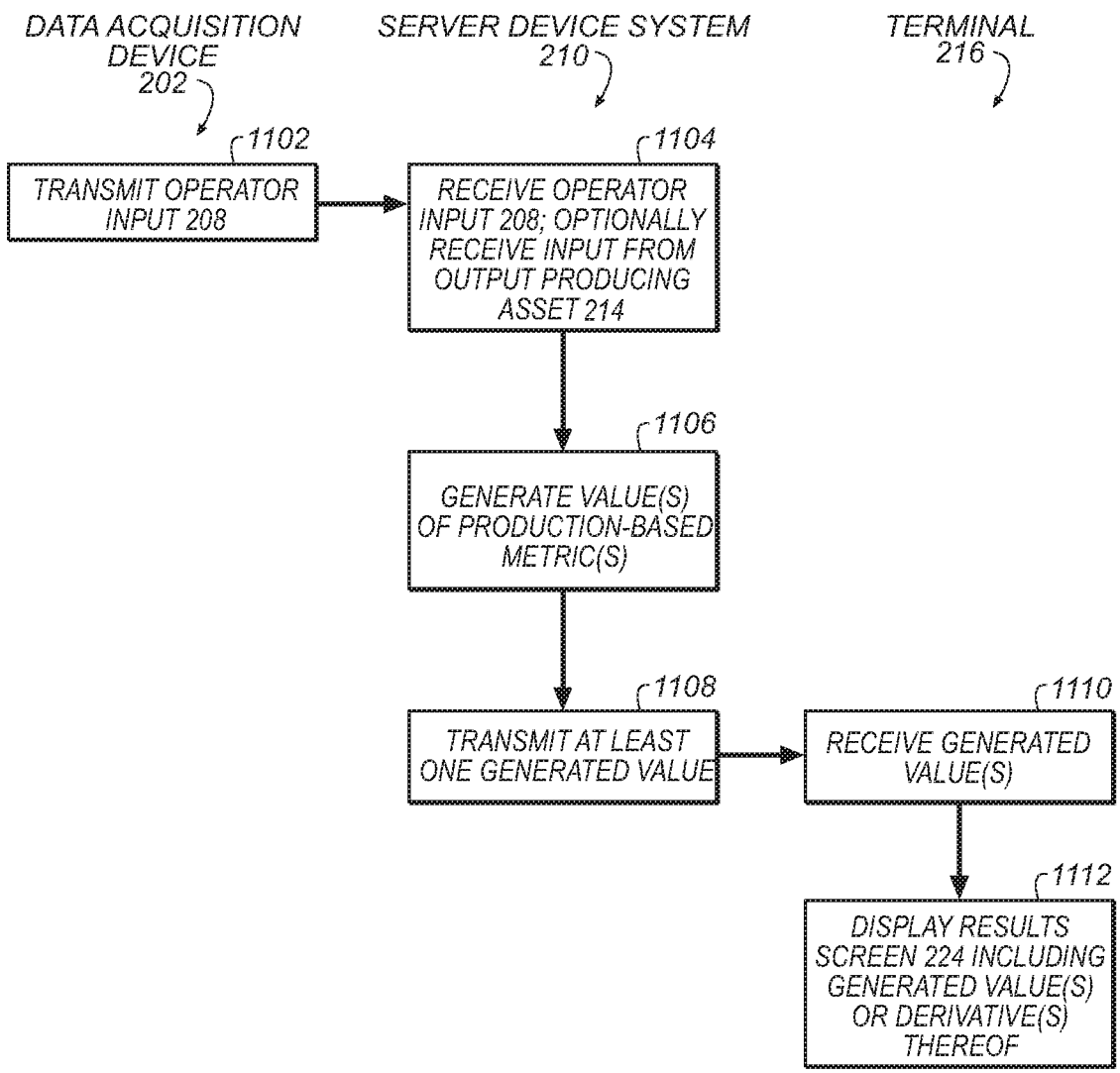
FIG. 11 illustrates a method of evaluating productivity of at least one output-producing asset, according to some embodiments of the present invention.

The data processing device system 110 includes one or more data processing devices that implement or execute, in conjunction with other devices, such as those in the system 100, methods of various embodiments of the present invention, including the example method of FIG. 11 described herein. Each of the phrases "data processing device", "data processor", "processor", and "computer" and the like is intended to include any data processing device, such as a central processing unit ("CPU"), a desktop computer, a laptop computer, a mainframe computer, a tablet computer such as an iPad (Trademark Apple Inc., Cupertino Calif.), a personal digital assistant, a cellular phone, a smartphone, or any other device for processing data, managing data, or handling data, whether implemented with electrical, magnetic, optical, biological components, or otherwise.

The memory device system 130 includes one or more processor-accessible memory devices configured to store information, including the information needed to execute the methods of various embodiments, including the example method of FIG. 11 described herein. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" and the like is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs. In some embodiments, each of the phrases "processor-accessible memory" and "processor-accessible memory device" is intended to include or be a processor-accessible (or computer-readable) data storage medium. In some embodiments, each of the phrases "processor-accessible memory" and "processor-accessible memory device" is intended to include or be a non-transitory processor-accessible (or computer-readable) data storage medium. In some embodiments, the memory device system 130 may be considered to include or be a non-transitory processor-accessible (or computer-readable) data storage medium system. And, in some embodiments, the memory device system 130 may be considered to include or be a non-transitory processor-accessible (or computer-readable) storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending upon the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 may be implemented by a single application-specific integrated circuit (ASIC) in some embodiments.

The input-output device system 120 may include a mouse, a keyboard, a touch screen, a computer, a processor-accessible memory device, or any device or combination of devices from which a desired selection, desired information, instructions, or any other data is input to the data processing device system 110. The input-output device system 120 may include a user-activatable control system that is responsive to a user action. The input-output device system 120 may include any suitable interface for receiving information, instructions or any data from other devices and systems described in various ones of the embodiments.

The input-output device system 120 also may include an image generating device system, a display device system, a computer, a processor-accessible memory device, or any device or combination of devices to which information, instructions, or any other data is output by the data processing device system 110. The input-output device system 120 may include any suitable interface for outputting information, instructions, or data to other devices and systems described in various ones of the embodiments.

If the input-output device system 120 includes a processor-accessible memory device, such memory device may or may not form part or all of the memory device system 130.

Figure 2:
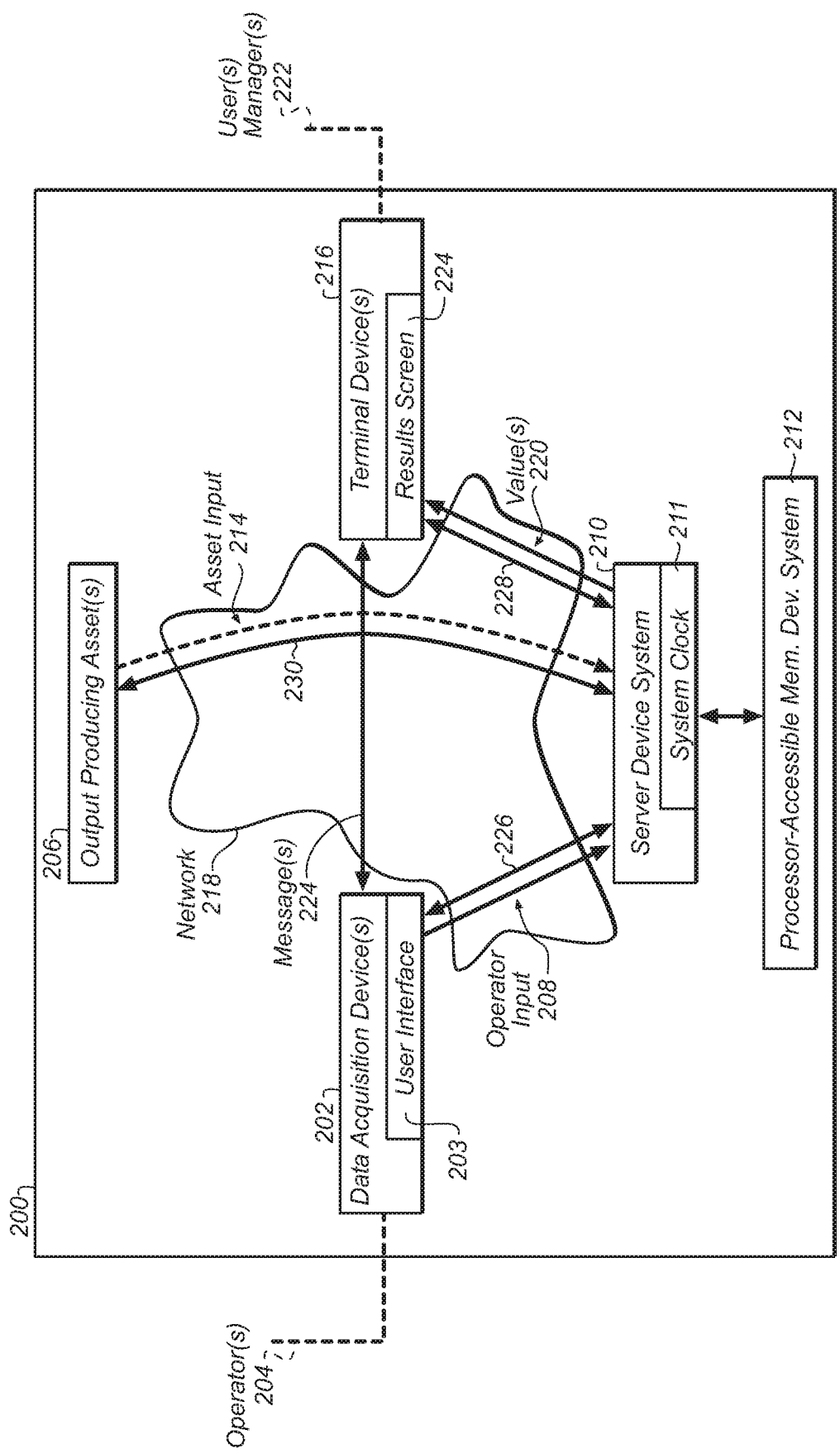
FIG. 2 illustrates some particular versions of the system of FIG. 1, according to some embodiments of the present invention.

According to some embodiments of the present invention, the data processing device system 100 includes the data processing device system 200 shown in FIG. 2, or vice versa. In this regard, the data processing device system 200 may include at least one data acquisition device 202 operated by at least one user or operator 204. An operator 204 of a data acquisition device 202 facilitates operation of one or more output-producing assets 206. An example of an output-producing asset 206 is a printing device, such as a printing press. However, the present invention is not limited to a printing device or a printing press as an output-producing asset 206, and the present invention may be applied to any type of output-producing asset. For example, an output-producing asset 206 may be a digital or an analog press (e.g., offset lithography, etc.), a "light" production printer known in the art, a wide-, large- and grand-format printer known in the art, or any other type of production machinery where increased productivity has value.

As mentioned, the system 200 may accommodate multiple output-producing assets 206. These multiple output-producing assets 206 need not be of the same type and need not be at the same location. In some embodiments, the output-producing assets 206 are spread across multiple separate geographic sites.

An operator 204 may facilitate operation of an output-producing asset 206 by, among other things, setting up the output-producing asset 206 to execute an output-producing job or servicing the output-producing asset 206. More examples of tasks that may be performed by an operator 204 to facilitate operation of an output-producing asset 206 are described subsequently in this description as examples of events associated with an output-producing asset 206.

Through the course of facilitating operation of an output-producing asset 206, the operator 204 may provide operator input 208, via a data acquisition device 202, that may, among other things, record information regarding events associated with the output-producing asset 206. For example, the operator input 208 may, among other things, record information regarding the operation or non-operation of an output-producing asset 206. In some embodiments, the operator input 208 may indicate initiation, conclusion, or both initiation and conclusion of a plurality of events associated with an output-producing asset 206. In some embodiments, the operator input 208 may include activity-, or event-, specific auxiliary information, such as information regarding consumable usage, job characteristics, etc. In some embodiments, the data acquisition device 202 (or some other device that has access to the operator input 208, such as the server device system 210), may be configured to automatically detect logical errors in the sequence of events or activities input by the operator and may be configured to provide operator warnings and error-correction routines.

In some embodiments, the operator input 208 includes information known by the operator 204, but not known to the implicated output-producing asset 206. For example, an output-producing asset 206 might have sensors that detect that the output-producing asset 206 is not operational, but the output-producing asset 206 might not have (or not have access to) information indicating that the output-producing asset 206 is not operational as a result of (a) the operator 204 being in a staff meeting or on a rest break, (b) an unavailability of output jobs, (c) the operator 204 waiting for a period of time for a supervisor or manager to approve a job, (d) an ending of an operator shift or workday, e.g., when cleanup or other shop closing activity is being performed, etc. For another example, an output-producing asset 206 might have sensors that detect that a print job concluded without any detected errors, but the output-producing asset 206 might not have (or not have access to) information indicating that the time spent producing the print job actually was wasted time because the output of the print job did not meet certain appearance or quality standards (e.g., had a defect in the output), as judged by the operator 204 that input the job or by another operator 204 that may not have initially input such job. Such a defect, e.g., may be due to an erroneous instruction or parameter input by an operator 204, and, even though the output-producing asset 206 correctly output the job in accordance with that instruction or parameter, the output is deemed to be defective due to the operator's error, and the output-producing asset would not indicate any error in such an instance. Accordingly, in some embodiments of the present invention, a data acquisition device 202 is configured to provide a user interface 203 (e.g., FIG. 3, discussed below) for an operator 204 through which the operator 204 may input these types of information that are otherwise unavailable to the output-producing asset 206. With these types of information, the system 200 is able to generate more descriptive or accurate values of performance-based metrics so that decision-makers are better able to evaluate the performance of (a) output-producing assets 206, (b) the organizations to which such assets belong, (c) the return on the investment (ROI) made to acquire such assets, or a combination of some or all of (a)-(c).

In some embodiments, an operator 204 signs or logs into the system 200 (e.g., into the server device system 210) at the data acquisition device 202 via its user interface 203 (e.g., FIG. 3, discussed below). Such user interface 203 may be a custom, individual password-protected portal. Login may occur at the start of the operator's (204) shift, and, assuming there are multiple output-producing assets 206 being tracked by the system 200, the logged-in operator 204 may select the output-producing asset 206 with which he or she will be working, according to some embodiments. In some embodiments, there is a separate data acquisition device 202 residing or associated with each output-producing asset 206. In at least these cases, operator selection of a particular output-producing asset 206 with which the operator 204 is working is unnecessary, and a user interface 203 customized for the associated output-producing asset 206 may be displayed upon operator login. In this regard, the system 200 (e.g., by way of at least a data acquisition device 202) may record (e.g., in a database in the processor-accessible memory device system 130 or 212) which member of the operating staff is using the data acquisition device 202 and generating the corresponding operator input 208, which press the operator 204 is operating, and, if the prior shift end has been entered, the beginning of a new shift. In some embodiments, touching a single icon performs the operator login function for an assigned output-producing asset 206.

The user interface 203 (e.g., FIG. 3, discussed below) of the data acquisition device 202 may have a customized screen depending upon, but not limited to, the manufacturer of the associated output-producing asset 206, the type of output-producing asset 206 (e.g., sheet-fed, roll-fed, etc. in the case of printing presses), model, or technology (e.g., xerographic, inkjet, offset, etc. in the case of printing presses). In a multiple output-producing-asset site (e.g., a print shop), each output-producing asset 206 might have its own customized and dedicated user interface 203 for the data acquisition device(s) 202.

In some embodiments, a data acquisition device 202 is implemented as a tablet computer (e.g., an iPad™ or iPad™ mini), and the user interface 203 is implemented as an "app", or lightweight application, known in the art, for the tablet computer. A tablet computer (e.g., an iPad™ or iPad™ mini) may be suitable in some embodiments to provide an appropriate size and a touch-sensitive data entry method that is rapid, effective, and of low impact on the operator 204. In some embodiments, all of the functions needed by an operator 204 may be conveniently displayed on a tablet computer in landscape mode (see, e.g., FIG. 3, discussed in more detail below), with additional screen real estate available via a simple scroll. Other configurations are possible. For example, in some embodiments, the user interface 203 is implemented as a web application with Internet connectivity (e.g., via the network 218, which may include the Internet) on the data acquisition device 202, which, in this case, may be any type of device that includes a web browser configured to execute the web application, such as a computer, smartphone, tablet computer, etc. If Internet connectivity is not available, local store-and-forward may be implemented; of course, the operator may enter data on hardcopy forms designed for the purpose, with data subsequently entered into a database of the system 200 (e.g., a database stored in the processor-accessible memory device system 212).

In some embodiments, a data acquisition device 202 transmits the operator input 208 to a communicatively connected server device system 210 via a network 218. See, e.g., FIG. 11, step 1102. On the other hand, the server device system 210 may be configured, for example, at least by a program stored in a communicatively connected processor accessible memory device system 212, to receive the operator input 208 via a data acquisition device 202. See, e.g., FIG. 11, step 1104. The server device system 210 may then store the operator input 208 (including any operator input 208 described with respect to any or all of the various embodiments of the present invention disclosed herein) in the processor accessible memory device system 212. In some embodiments, the storing of operator input 208 from one or more data acquisition devices 202 causes the generation of a log of events (see, e.g., FIG. 4, discussed below) in the processor accessible memory device system 212, the events occurring with respect to one or more output-producing assets 206.

In some embodiments, one or more of the output-producing assets 206 may provide their own input (i.e., asset input 214) for storage in the processor accessible memory device system 212. In some embodiments, one or more of the output-producing assets 206 may provide the asset input 214 to the server device system 210, which may then store such asset input 214 in the processor accessible memory device system 212. In other words, the server device system 210 may be configured to receive the asset input 214 from one or more of the output-producing assets 206. See, e.g., FIG. 11, step 1104. The asset input 214 may indicate initiation, conclusion, or both initiation and conclusion of a plurality of events associated with an output-producing asset 206. In some embodiments, asset input 214 is transmitted from an output-producing asset 206 to a data acquisition device 202 via a communicative connection between them, and such asset input 214 may be included in the operator input 208, such that the operator input includes information concerning input from the output-producing asset 206.

In some embodiments, some of the data entry activity may be automated by communicatively connecting the data acquisition device 202 and an associated output-producing asset 206, by communicatively connecting the output-producing asset 206 with the server device system 210, or both. Such an environment allows automatic data entry from the output-producing asset 206 of certain press activities or events and their specifics. Activities or events such as the commencement of a print are known by the press, and the associated data may be sent to the system database (e.g., a database in the processor accessible memory device system 212) by the output-producing asset 206 (e.g., by way of the server device system 212, the data acquisition device 202, or both, or merely directly from the output-producing asset 206 to such database in some embodiments). This asset input 214 from the output-producing asset 206 may then be merged appropriately with the operator input 208 in the database (e.g., in the processor accessible memory device system 212). In some embodiments, at least some of the asset input 214, the operator input 208, or both, may be entered into the database (e.g., in the processor accessible memory device system 212) in a batch mode.

In some embodiments, the input (e.g., operator input 208, asset input 214, or both) is accumulated over time and stored in a system database in the processor-accessible memory device system 212. Such database may be maintained by or in the server device system 210, which may be "in the cloud", e.g., remotely located in a secure, protected, high-speed Internet access environment. Alternately, in some embodiments, the system database may be incorporated within a local system provided at the location of one or more of the output-producing assets 206. In some embodiments, the system database may include multiple databases or sections thereof. For example, an individual section may correspond to one shift of one operator of one day of one press of one location of one print shop of one customer, etc. In some embodiments, the database may include such information in fields within each record, thereby facilitating data queries and other analyses. In some embodiments, the database contains information for each activity and its start time, as well as comments and other auxiliary information. However, it should be noted that the invention is not limited to any particular database structure(s), location(s), or types or formats of information stored therein.

In some embodiments, the server device system 210 is configured, in response to receiving the operator input 208, the asset input 214, or both, to confirm at least some of such input. For example, in some embodiments, the server device system 210 may confirm some of the operator input 208 by transmitting it back to the data acquisition device 202 that sent it to the server device system 210. In this regard, the data acquisition device 202 may display the input to be confirmed to the operator 204 with a user interface option to confirm, correct, add, re-categorize, etc., such input. However, confirmation of operator input 208 need not occur at the data acquisition device 202 and may occur at another data acquisition device 202 for confirmation by the operator 204 that initially provided such input or by another operator 204 that did not initially provide such input. In addition or in the alternative, such confirmation may occur at a terminal device 216, for example, so that a manager has the opportunity to confirm or correct such input. Manager confirmation may be beneficial in instances where extreme or highly-impactful input has been provided, such as a major failure of an output-producing asset 206 or a failure in a large or expensive print job. In addition, or in the alternative, confirmation of operator input 208 need not occur after transmission of such input to the server device system 210. For example, the input may be confirmed locally at the data acquisition device 202 without transmission of such input to another device prior to confirmation. In some embodiments where confirmation of operator input 208 is sought from a terminal device 216, the data acquisition device 202 may be configured to transmit such input directly to the terminal device 216 for confirmation, instead of or in addition to transmitting such input to the server device system 210.

Asset input 214 may be confirmed in the same or similar manners as described above with respect to confirmation of operator input 208. For example, in response to receiving asset input 214, the server device system 210 may be configured to transmit at least some of such input 214 to a data acquisition device 202, a terminal 216, or both for confirmation. In some embodiments, the data acquisition device 202, the terminal 216, or both, may display such received input with a user interface option to confirm or correct such input. However, confirmation of at least some of the asset input 214 need not occur by way of transmission of such input from the server device system 210. For example, an output-producing asset 206 may transmit asset input 214 directly to a data acquisition device 202, a terminal device 216, or both, and confirmation of at least some of such input 214 may then occur locally at the respective device 202, 216.

In this regard, at least some of the asset input 214, the operator input 208, or both, may include operator input generated as a result of a confirmation request or a query from an output-producing asset 206. For example, an operator 204 may indicate via user interface 203 of a data acquisition device 202 that a print is initiating at an output-producing asset 206. In response to this input, the output-producing asset 206 (or the server device system 210, or even the data acquisition device 202, itself, for example) may be configured to query the data acquisition device 202 to prompt the operator 204 to specify whether or not the print is a proof print or a production print. The operator's reply to this query may be included in the operator input 208, the asset input 214, or both.

According to some embodiments, the server device system 210 is configured to generate a value of a production-based metric associated with at least some of the plurality of events or activities, which are associated with an output-producing asset 206, based at least upon an analysis of at least some of the received operator input 208. See, e.g., FIG. 11, step 1106. In this regard, the server device system 210 may be configured to generate a respective value for each of a plurality of respective production-based metrics associated with at least some of a plurality of events or activities, which are associated with one or more output-producing assets 206, based at least upon an analysis of at least some of the received operator input 208. The production-based metric may indicate, for example, a productivity, an actual production time, a potential production time, a utilization, or an uptime of an output-producing asset 206, as discussed in more detail below. The production-based metric may be a time or duration-based metric associated with at least one of the plurality of events, which may be logged in the processor accessible memory device system 212, and which may be associated with one or more of the output-producing assets 206.

In some embodiments (e.g., of step 1106 in FIG. 11), the server device system 210 is configured to generate a value of a production-based metric associated with at least some of the plurality of events or activities, which are associated with at least one of the output-producing assets 206, based at least upon an analysis of at least some of the received operator input 208 and the received asset input 214. Any or all of the generated values of one or more production-based metrics described with respect to any of the various embodiments of the present invention herein are stored in the processor-accessible memory device system 212, according to some embodiments.

Upon generation of one or more values of one or more production-based metrics (e.g., at step 1106 in FIG. 11), the server device system 210 may be configured to transmit at least one of such one or more values via the network 218 to a terminal device 216 communicatively connected to the server device system 210, as illustrated by reference numeral 220 in FIG. 2. See, e.g., FIG. 11, step 1108. Stated from another perspective, a terminal device 216 may be configured to receive one or more values 220 of a production-based metric from the server device system 210. See, e.g., FIG. 11, step 1110. In this regard, the value(s) 220 may be transmitted by the server device system 210 for display at least as part of a results screen 224 at the terminal device 216. See, e.g., FIG. 11, step 1112. In other words, the value(s) 220 may be transmitted to the terminal device 216 in a configuration adapted to be displayed at the terminal device 216. For example, the value(s) 220 may be transmitted from the server device system 210 with accompanying instructions in a format that is able to be interpreted by the terminal device 216 for display at the terminal device 216. Examples of the results screen 224 are provided and discussed below with respect to FIGS. 6 and 8.

A terminal device 216 may be operated by a user 222. In some embodiments, the user 222 may be a manager of an organization or a consultant to an organization responsible for operating the output-producing asset(s) 206. In this regard, a terminal device 216 may be referred to as a manager terminal in some embodiments. In some embodiments, a plurality of terminal devices 216 are communicatively connected to the server device system 210, and the server device system 210 may transmit the value(s) 220 to one or more of such terminal devices 216, for example, via the network 218, for display at the respective terminal devices 216.

Although examples are provided herein with respect to the server device system 210 transmitting value(s) 220 to a terminal device 216 for display as at least part of a results screen 224, it should be noted that the invention is not limited to this particular configuration. For instance, the value(s) 220 may be transmitted to a data acquisition device 202 for display and, accordingly, the results screen 224 may be displayed at such data acquisition device 202. Therefore, it should be noted that the results screen 224 may be displayed at any of the devices 202, 206, 210, 216 in FIG. 2.

The results screen 224 may present the value(s) 220, so that the user 222, an operator 204, or some other user or decision-maker may understand a production characteristic of one or more of the output-producing assets 206. In some embodiments, the results screen 224 may include a comparison of values of a production-based metric for a particular output-producing asset 206 (e.g., over different time periods or for comparing different operators or operator shifts) or for multiple output-producing assets 206.

A results screen 224 may be implemented at least as part of an "app", such as a "cloud-based" mobile application for a tablet or similar computer, may be implemented as a web application suitable for display in a web browser, or any other application structure. The application or applications that configure(s) the terminal (or other) device 216 to generate the results screen 224 may also be configured to cause information presented in the results screen 224 to be output in another electronic form, e.g., by e-mail or other messaging service, in hardcopy form, or both, according to some embodiments.

In some embodiments, a terminal device 216 is configured to allow a user 222, e.g., a member of management, to log into the system (e.g., the server device system 210) through a custom, individual password-protected Manager portal. Login may be at any time and at any place in which there is web connectivity with the server device system 210, according to some embodiments. In this regard, although the terminal device 216 may be any sort of computer, there may be benefits in some circumstances to have the terminal device 216 be a mobile computer, such as a smartphone or a tablet computer, so the user 222 (e.g., manager) has access to production-based information about asset(s) 206 at nearly any time or place. Since login is individual, according to some embodiments, different members of management may have different levels of access to the data acquired (e.g., input 208, 214, or both) and generated (e.g., including value(s) 220) by the server device system 210. Assuming multiple output-producing assets 206 are being tracked by the server device system 210 and are designated to be accessible to a particular user (e.g., manager) 222, the terminal device 216 may be configured to allow such user (e.g., manager) 222 to select the output-producing asset(s) 206 for which he or she desires to view analysis results generated by the server device system 210.

In this regard, it should be noted that the analysis and generation of values (e.g., FIG. 11, step 1106) performed by the server device system 210 may be performed in response to a user request received by the server device system 210. For example, a user 222 (or other user, e.g., operator 204) wanting to view a results screen 224 may indicate parameters (e.g., which output-producing asset(s) 206, which operator(s), which time period(s), etc.) used by the server device system 210 to generate the appropriate value(s) 222 for such results screen 224. In this regard, the device at which the user is inputting these parameters (e.g., a terminal device 216 or a data acquisition device 202) may transmit such parameters along with or included in a user-request to the server device system 210, which may prompt or trigger the server device system 210 to generate the appropriate value(s) 220. In this regard, the results screen 224, subject to calculation times and data transmission latency, may be generated in real-time on request, according to some embodiments of the present invention.

In some embodiments, a user 222 requests (e.g., via a user interface of a terminal device 216) an analysis of a single output-producing asset. The server device system 210 may default to the current date and a predetermined historical number of days, weeks, months, etc. These parameters are easily changed by the user (e.g., via a user interface of a terminal device 216) to facilitate requests for other analyses.

In some embodiments of the present invention, one or more of the terminal devices 216 and one or more of the data acquisition devices 202 are configured to message each other (e.g., message(s) 224), such as by way of e-mail, instant messaging, text messaging, voice messaging, or other messaging services known in the art. For example, a terminal device 216 may be configured to message a data acquisition device 202, a data acquisition device 202 may be configured to message a terminal device 216, multiple data acquisition devices 202 may be configured to message each other, multiple terminal devices 216 may be configured to message each other, or a combination of some or all of these configurations may be implemented. In some embodiments, messaging between terminal devices 216, between data acquisition devices 202, or between a data acquisition device and a terminal device is facilitated by the server device system 210. For example, such messages may be transmitted from the source device to the server device system 210, and then from the server device system 210 to the destination device. These messages may be merely manually generated at will by a user or may be automatically generated in response to a condition.

In this regard, the data processing device system 200 may be configured to generate a message in response to occurrence of a condition, like the above-discussed messages. For example, an output-producing asset 206, a data acquisition device 202, a device in the server device system 210, or a combination of some or all of these devices may notify at least one other device in FIG. 2 (e.g., 202, 206, 216, 210) of the occurrence of such a condition. Such a condition may be, for example, a change in state (e.g., a change to an abnormal state) associated with an output-producing asset 206 or the entry of new operator input 208 at a data acquisition device 202 by an operator 204. The condition may be the entry of a particular event contained in the operator input 208, such as an abnormal event. An abnormal event may be a print failure of an output-producing asset 206, excessive idle time of an output-producing asset 206, and absence of an operator 204, or any other event that may impact production of an output-producing asset 206.

Although FIG. 2 illustrates the transmission of some particular data (e.g., operator input 208, asset input 214, message(s) 224, value(s) 220), it should be noted that the invention is not limited to these data transmissions and that the system 200 may include any other data transmissions between any of the devices in FIG. 2 and in any direction. In this regard, although FIG. 2 illustrates some particular directions of data flow (e.g., operator input 208 from the data acquisition device(s) 208 to the server device system 210, and value(s) 220 from the server device system 210 to the terminal device(s) 216), the invention is not limited to data transmission in these illustrated directions. For example, in some embodiments, the server device system 210 may transmit data to the data acquisition device(s) 202 (e.g., arrow 226), to the terminal device(s) 216 (e.g., arrow 228), to the output-producing asset(s) 206 (e.g., arrow 230), or to some or all of the data acquisition device(s) 202, the terminal device(s) 216, and the output-producing asset(s) 206.

In addition, although FIG. 2 illustrates a particular configuration of devices, the present invention is not limited to such configuration. For example, although the terminal device(s) 216 and the data acquisition device(s) 202 are shown separately in FIG. 2, it should be noted that a terminal device 216 and a data acquisition device 202 may be the same device, according to some embodiments of the present invention. For instance, a manager 222 and an operator 208 may operate the same device, and the results screen 224 may be displayed at the same device that implements the operator user interface 203. For another example, although FIG. 2 illustrates the data acquisition device(s) 202 and the output-producing asset(s) 206 separately, a data acquisition device 202 and an output-producing asset 206 may be the same device. For instance, the user interface 203 that receives the input from operator 204 may be presented on a display device of an output-producing asset 206. For yet another example, although FIG. 2 illustrates the server device system 210 as its own entity, the functions of the server device system 210 may be part of a data acquisition device 202, part of a terminal device 216, or both. For instance, the server device system 210 and the terminal device 216 could be built into a data acquisition device 202, such that the data acquisition device 202 receives the operator input 208, stores it in a local memory device (e.g., a flash drive) as part of the processor accessible memory device system 212, and generates the one or more values 220, and locally generates and displays the corresponding results screen 224. In other words, the devices 202, 210, 212, and 216 in FIG. 2 could be formed into a single device that executes all of the steps of the method of FIG. 11. Going a step further, all of the devices of FIG. 2, including the output-producing asset 206 could be formed into a single device, such that a single output-producing asset 206 is configured to perform all of the steps of the method of FIG. 11.

With respect to relationships between FIGS. 1 and 2, the processor-accessible memory device system 212 may correspond to the processor-accessible memory device system 130. The data acquisition device(s) 202, the server device system 210, the terminal device(s) 216 may all correspond to the data processing device system 110. While the output-producing asset(s), since they typically have their own processing capabilities, may be considered to also correspond to the data processing device system 110, the output-producing asset(s) may instead or additionally correspond to the data input-output device system 120, at least because asset input 214 may be provided. Similarly, the data acquisition device(s) 202 may correspond to the data input-output device system 120 at least because operator input 208 is provided.

Further, although the system 200 in FIG. 2 is shown to include all of the devices 202, 206, 210, 212, 216, the system 200 may instead include a subset of these devices. For example, the system 200, in some embodiments, includes the server device system 210 and the processor-accessible memory device system 212, with the data acquisition device(s) 202, the output-producing asset(s) 206, and the terminal device(s) 216 being excluded from the system 200, but (at least the data acquisition device(s) 202 and the terminal device(s) 216, e.g., being communicatively connected to the server device system 210. For another example, the system 200 may include a data acquisition device 202 and the processor-accessible memory device system 212 directly connected to (or within a same housing as) the data acquisition device 202, with the devices 206, 210, and 216 excluded from the system 200, but (at least the server device system 210) being communicatively connected to the data acquisition device 202. Similarly, the system 200 may include a terminal device 216 and the processor-accessible memory device system 212 directly connected to (or within) terminal device 216, with the devices 202, 206, and 210 excluded from the system 200, but (at least the server device system 210) being communicatively connected to the terminal device 216.

Further, FIG. 2 illustrates the processor-accessible memory device system 212 as being directly connected to the server device system 210. In this regard, because some or all of the devices 202, 206, 210, 216 in FIG. 2 may be communicatively connected with each other, the processor-accessible memory device system 212 may be deemed to be communicatively connected to any of the devices 202, 206, 210, 216 indirectly, in some embodiments, e.g., by way of the server device system 210. However, in some embodiments, although FIG. 2 illustrates the processor-accessible memory device system 212 as being only connected to the server device system 210, the processor-accessible memory device system 212 may include, in some embodiments, some or all of the processor-accessible memory devices directly connected to (or within the same housing of) the data acquisition device(s) 202, the terminal device(s) 216, the output-producing asset(s) 206, and the server device system 210.

Accordingly, it can be seen that the invention is not limited to any particular arrangement of devices or communicative connections between devices, and those illustrated in FIG. 2 are merely provided as one possible example.

Figure 3:
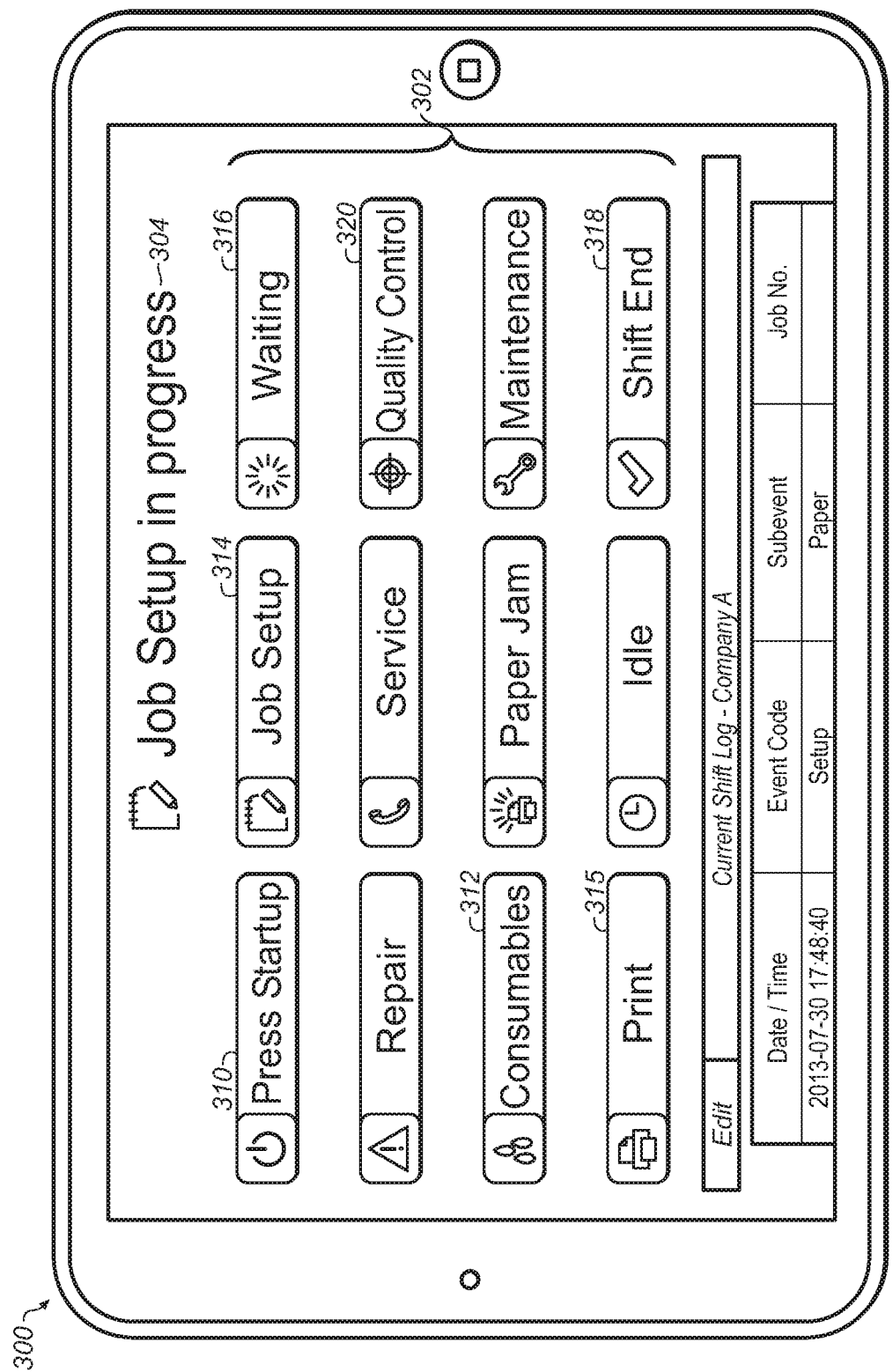
FIG. 3 illustrates a user interface of a data acquisition device from FIG. 2, according to some embodiments of the present invention.

FIG. 3 illustrates a user interface 300 provided by a data acquisition device 202 through which an operator 204 may input operator input 208, according to some embodiments of the present invention. The user interface 300 is an example of a possible implementation of the user interface 203 in FIG. 2. The user interface 300 includes a plurality of software keys 302, each key associated with one or more events (or activities) or event (activity) categories (e.g., types) that may occur with respect to an output-producing asset 206. A status of a particular output-producing asset 206 that is associated with the user interface 300 is illustrated in display region 304. In this regard, the user interface 300 may be associated with only one output-producing asset 206 or maybe associated with a plurality of output-producing assets 206, in which case, a user may select a particular output-producing asset 206 with which the user interface 300 is associated at a present time. In some embodiments, a screen region may be provided that allows an operator 204 to input an impression number, a job number, comments, images, or other auxiliary information that are to be associated with a particular event. In some embodiments, an "Event Code Descriptions" page or screen may be accessed by touching a software button, the "Event Code Descriptions" page or screen allowing an operator 204 to input manual event code descriptions and access subsequently presented menus and software keys to identify an event.

FIG. 4 illustrates a subset "A" 402 of the operator input 208 that is input by an operator 204 via the user interface 300 in FIG. 3, according to some embodiments. The operator input 402 indicates a plurality of events associated with a first output-producing asset ("OPA") 406, each event illustrated in FIG. 3 as a row in the illustrated table 404. It should be noted that the table 404 is an example of one data format for organizing the operator input 208, and it should be understood that the operator input 208 may identify events or activities using any other data format. It should also be understood that, although FIG. 4 illustrates a sequence of events or activities with the most recent event last, any other ordering of events may be used. The output-producing asset 406 corresponds to an output-producing asset 206 illustrated in FIG. 2.

According to some embodiments, at the start of each new event or activity, the operator 204 identifies the event's category via keys 302 on the user interface 300, and the information is sent to the server device system 210 as a subset of the operator input 208 for storage in a database in the processor-accessible memory device system 212. In addition, the operator 204 or the output-producing asset 206 or both may also input additional auxiliary information relating to the event, such as Impression Number, Job Number, Commentary, images, etc.—and any category specific auxiliary information, such as type of Consumable/Part changed, Error Repaired, or Maintenance performed, etc. This auxiliary information may be included in the operator input 208, asset input 214, or both. In some embodiments, after entry (via user interface 300) and initiation of an event, the user interface 300 may return to a quiescent display state and acknowledge that the event or activity is underway. The user interface 300 may also show the elapsed duration of the event or activity in progress. Event insertion, deletion, and editing functions may be implemented.

According to some embodiments, an operator 204 inputs an event 408 in FIG. 4 by selecting a "press start up" key 310, and inputting a time 410 at which the event is initiated. An event 412 is similarly input by an operator 204 selecting a "consumables" key 312, and inputting a time 414 at which this event is initiated. Alternately, the time may be automatically entered by the system clock 211, or the operator 204 may modify such time, for example, to account for lateness in data entry. In addition, with respect to the event 412, and operator 204 may input a comment "toner" as auxiliary information in the comment field of the screen region 306 in order to specify a type of consumable being changed by the event 412. Alternatively, in some embodiments, the type of consumable being changed is merely a sub-event, or a more detailed event description, that an operator 204 specifies in a menu of sub-events that is presented upon selection of the "consumables" key 312.

In this regard, an event 416 may be specified by an operator 204 selecting a "job set up" key 314, and then selecting "Proof" (e.g., instead of "production") as a sub-event or more detailed event from a subsequently presented menu. In some embodiments, such a subsequently presented menu may be presented on the user interface 300 in response to a request generated by the output-producing asset 206 (presently) associated with the user interface 300. Such a request may be transmitted directly from the output-producing asset 206 to the data acquisition device 202, or may be transmitted to the data acquisition device 202 by way of the server device system 210 or a terminal device 216.

Event 418, event 422, and event 426 each may be specified by an operator 204 selecting a "print" key 315 and inputting an associated event-initiation time. Alternately as above, the event-initiation time may be automatically entered by the system clock 211, or the operator 204 may modify such time. Event at 420 may be specified by an operator 204 selecting a "waiting" key 316 and then selecting an "approval" sub-event classification or category from a subsequently displayed submenu. Event 428 may be specified by an operator 204 selecting a "shift end" key 318 to designate the end of an operator's shift. An event 424 may be specified by an operator 204 selecting a "quality control" key 320 and then selecting an "artifact" sub-event designation from a subsequently displayed submenu. In the example of FIG. 4, an operator 204 may supplement event 424 with an image ("poor_output.jpg") as auxiliary information, the image showing the artifact on the output that lead to the event 424.

According to some embodiments of the present invention, the operator input 402 is transmitted as part of the operator input 208 to the server device system 210 for storage in the processor accessible memory device system 212. In some embodiments, the server device system 210 is configured to generate a value of a production-based metric based at least upon an analysis of at least some of the operator input 402. See, e.g., FIG. 11, step 1106.

Such analysis may include calculating a total amount of time spent for each event category (e.g., press start up, consumables, print, waiting, etc.) represented in the group of events (e.g., events of subset "A" 402 in FIG. 4) being analyzed over a given time period, such as one or more shifts, days, etc., as may be specified by a user 222. The given time period may be as small as part of a single shift to as large as a year or more, limited only by the current content of the events stored in the processor-accessible memory device system 212.

In the example of FIG. 4, the duration of each event (each row in FIG. 4) is the duration between the initiation time of the subsequent event and the initiation time of the event whose duration is being calculated. For instance, the duration of the event 408 is the duration between the initiation time of the subsequent event (i.e., 8:20 for the event 416) and the initiation time (8:00) of the event 408, which results in a duration of twenty minutes. Accordingly, requiring an operator 204 to only input the initiation of each event may be a more efficient technique for generating event durations, as compared to requiring an operator 204 to input initiation and conclusion of each event. However, the present invention is not limited to any particular approach in this regard.

Figure 5:
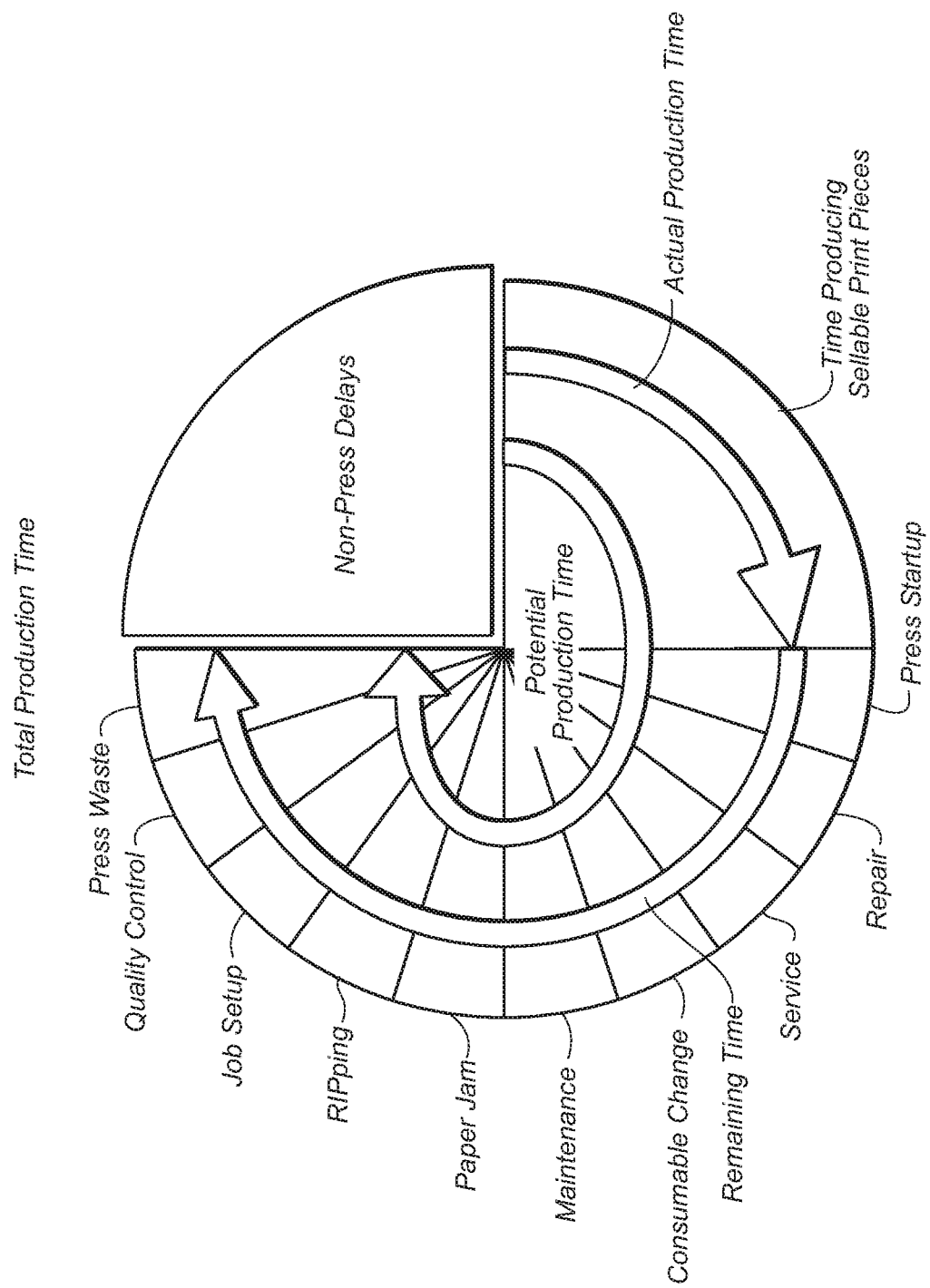
FIG. 5 illustrates elements of a "Total Production Time" performance-based metric, according to some embodiments of the present invention.

Having calculated the duration of each event represented in the operator input being analyzed, a total amount of time spent for each event category is calculated, according to some embodiments, as part of the analysis associated, e.g., with step 1106 in FIG. 11. It should be noted that a calculated total amount of time spent on an event category may be considered a generated value of a production-based metric, according to some embodiments. FIG. 5 illustrates a result of calculating the total amount of time spent over a time period for each category in this example in a pie-chart format. It should be noted, however, that the present invention is not limited to any particular format of presenting the total amount of time per category. In the example of FIG. 5, each pie-chart section (e.g., Press Waste, Quality Control, etc.) on the left-half of the pie-chart represents a total amount of time for a particular event category. According to some embodiments, these categories on the left-half of the pie-chart are cumulatively considered to represent a "Remaining Time" performance-based metric, as distinguished from an "Actual Production Time" performance-based metric and a "Non-Press Delays" performance-based metric.

In this regard, according to some embodiments, a "Total Production Time" performance-based metric may be defined as a period during which an output-producing asset could be operational during a workday—typically from the start of the first shift through the end of the last shift on that workday. Within the Total Production Time, there may be the Non-Press Delays, which may include idle time such as staff meetings, operator breaks, lack of jobs to print, etc. The event categories that make up the Non-Press Delays may be added to, changed, or deleted by a user 222, administrator, or both, according to some embodiments. In this regard, the event categories discussed herein may be user-definable in some embodiments. However, in some embodiments, one or more event categories (and, in some embodiments, their associated production-based metrics) are fixed (e.g., not able to be changed at all or at least by any user or a user without sufficient authority). Excluding the Non-Press Delays leaves what, according to some embodiments, is defined as a "Potential Production Time" performance-based metric. Any of the performance-based metrics discussed herein may have one or more values (e.g., values 220) generated therefor by the server device system 210, e.g., as part of FIG. 11, step 1106. However, the present invention is not limited to any particular performance-based metric, and those that are provided herein are merely for illustration purposes.

The Potential Production Time, which is illustrated in FIG. 5, represents, according to some embodiments, the Actual Production Time and the Remaining Time. The Actual Production Time is, according to some embodiments, the sum of the event category or categories (e.g., the "Print" event category) that represents Sellable (or usable) output (as may be defined and identified by the operator, according to some embodiments). The Remaining Time, according to some embodiments, is the time spent on all of the remaining event categories, which might include, in some embodiments where the output-producing asset is a printing press, Press Waste, Quality Control, Job Setup, Waiting, Paper Jam, Maintenance, Consumable Change, Service, Repair, and Press Startup. In this regard, the event categories that make up the Remaining Time may include necessary overhead activities or tasks that may be obstacles to increased productivity. The event categories that make up the Remaining Time may be added to, changed, or deleted according to some embodiments pertaining to printing presses so as to best configure the system (e.g., system 200 and FIG. 2) for different press configurations, such as Sheet-fed, Roll-fed, Offset, etc., or even so as to add specific pre-press or post-press operations to the system.

According to some embodiments, a "Productivity" metric, which is another example of a production-based metric, is defined as the ratio of the Actual Production Time to the Potential Production Time, and may be expressed as a percentage. See equation (1), below.

$$\text{Productivity} = \text{Actual Production Time}/\text{Potential Production Time} \quad (1)$$

The Productivity metric represents the performance efficiency of the output-producing asset. Accordingly, the system (e.g., the system 200 in FIG. 2) may determine the Productivity average over any historical period, such as since the current shift began, over the prior shift, today, another day, a week, a month, etc.

According to some embodiments, another production-based metric is a "Utilization", which may be defined as the ratio of the Actual Production Time to the Total Production Time, and may be expressed as a percentage. See equation (2), below.

$$\text{Utilization} = \text{Actual Production Time}/\text{Total Production Time} \quad (2)$$

The Utilization metric may also be shown graphically. Since the system (e.g., system 200) may track the Non-Press Delays and specific auxiliary information about the Delay (such as No jobs to Print, Operator Breaks, Meetings, etc.), such information may also be categorically averaged and displayed to gain insights on operational capacity utilization, perhaps thereby achieving better operational efficiency.

According to some embodiments, another production-based metric is "Uptime", which may be defined as a ratio of (a) the sum of the Actual Production Time and Non-Press Delay time to (b) the Total Production Time, and may be expressed as a percentage. See equation (3), below.

$$\text{Uptime} = (\text{Actual Production Time} + \text{Non-Press Delays})/\text{Total Production Time} \quad (3)$$

The analysis of operator input 208 included as part of the generation of one or more values of performance-based metrics in step 1106 in FIG. 11 may include the calculations performed to generate such one or more value(s). For example, such analysis might include performing one or more of equations (1)-(3).

Upon generation of one or more values of one or more of the above-discussed production-based metrics (e.g., step 1106 in FIG. 11), a results screen (e.g., 224) may be generated and displayed (e.g., FIG. 11, step 1112), the results screen providing at least some of such one or more values for review by a user 222. In some embodiments where the server device system 210 generates such one or more values, the server device system 210 may transmit at least one of such values to a terminal device 216 (e.g., FIG. 11, step 1108) for display as part of the results screen 224 for manager 222 review.

In some embodiments, results of a requested analysis (e.g., including at least the value(s) 220) may be presented in easy-to-understand display (e.g., via results screen 224) at a manager terminal 216 or in a printed report, according to some embodiments. As shown in the examples of FIGS. 6 and 8, discussed in more detail below, the results screen 224 may include one or more graphs, such as pie charts showing the various event or activity categories associated with the output-producing asset(s) 206 being analyzed, perhaps grouped (e.g., by non-press delays, actual production time, and remaining time pursuant to the example of FIG. 5 in some embodiments) to give a visual representation of the relative magnitude of each category that comprises potential production time (e.g., FIG. 5, discussed below). The results screen 224 may also include a bar chart that shows the individual event or activity categories during various periods of time. Graphs may also be configured to show comparisons such as between presses or periods of time.

Figure 6A:
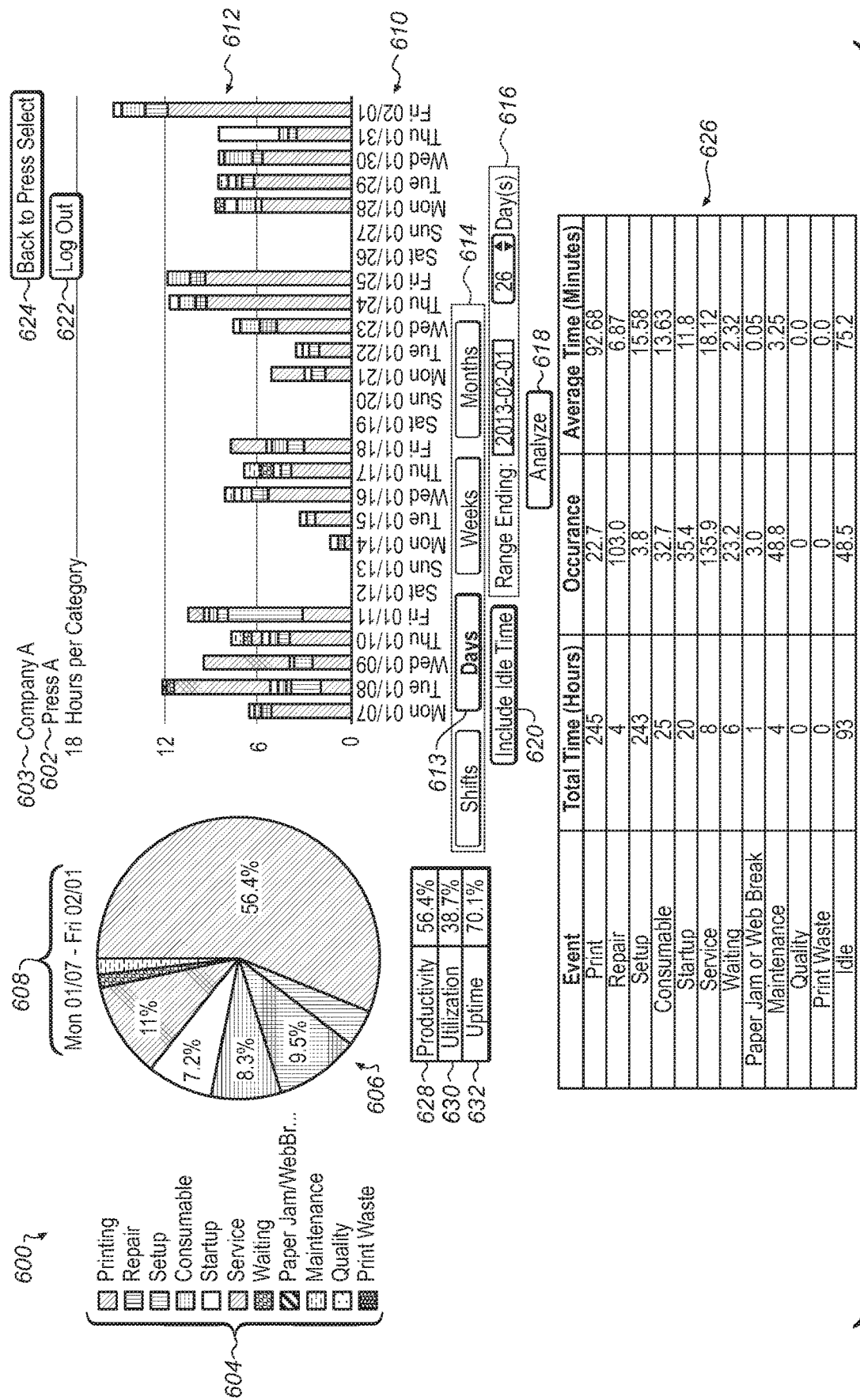
FIG. 6A illustrates a results screen displaying values of production-based metrics for a single output-producing asset, according to some embodiments of the present invention.

In this regard, FIG. 6A illustrates an example of the results screen 224, according to some embodiments of the present invention. In some embodiments, the user 222 may click on an assigned button displayed on a user interface of a terminal device 216 to view output-producing-asset utilization analysis and graphs via the results screen 600. The results screen 600 in FIG. 6A illustrates values of production-based metrics associated with events occurring with respect to a single output-producing asset 602 and a single organization 603. The results screen 600 may be displayed at a terminal device 216 for a manager or other user 222 that has logged into (e.g., an authenticated at) such terminal device 216. The user 222 may logout of the terminal device 216 by selecting a "Log Out" button 622, according to some embodiments. The user 222 may also change the output-producing asset 602 for which the results screen 600 is being displayed by calling up a selection menu via, for example, button 624, according to some embodiments.

In the example of FIG. 6A, values of production-based metrics generated by the server device system 210 (e.g., FIG. 11, step 1106) are displayed in graphical form via a pie chart 606 and a bar chart 612. It should be noted, however, that the present invention is not limited to any particular manner of displaying the generated values of production-based metrics, and those shown in FIG. 6A are merely examples. Any one of the values illustrated in the pie chart 606 or the bar chart 612 may be considered a value of a production-based metric, according to some embodiments.

In the example of FIG. 6A, the values of production-based metrics are generated by the server device system 210 for each of a plurality of event categories 604 and over a time period 608, 610. In this regard, the pie chart 606 illustrates a percentage of time spent by the output-producing asset 602 over the time period 608 on each of the event categories 604. The event categories represented in the pie chart 606 may selectively include or not include time spent on the "idle time" event category, depending upon user 222 activation of the "Include Idle Time" button 620.

In some embodiments, an overall Productivity percentage 628, Utilization percentage 630, and Uptime percentage 632 of the period of time 608 may be displayed on the results screen 600. In addition, in some embodiments, an overall percentage-of-time of each of the non-Productivity-based event categories over the time period 608 is displayed in a pie chart 606, each slice of the pie being proportional to the time spent and color-coded with the corresponding event category. In this regard, since the system (e.g., 200) may track all of the activities that comprise Potential Production Time, time-percentages over the time period 608 may be calculated for individual event categories (such as Repair time). The Productivity percentage 628 may also be displayed as a slice of the pie chart 606.

Figure 6B:
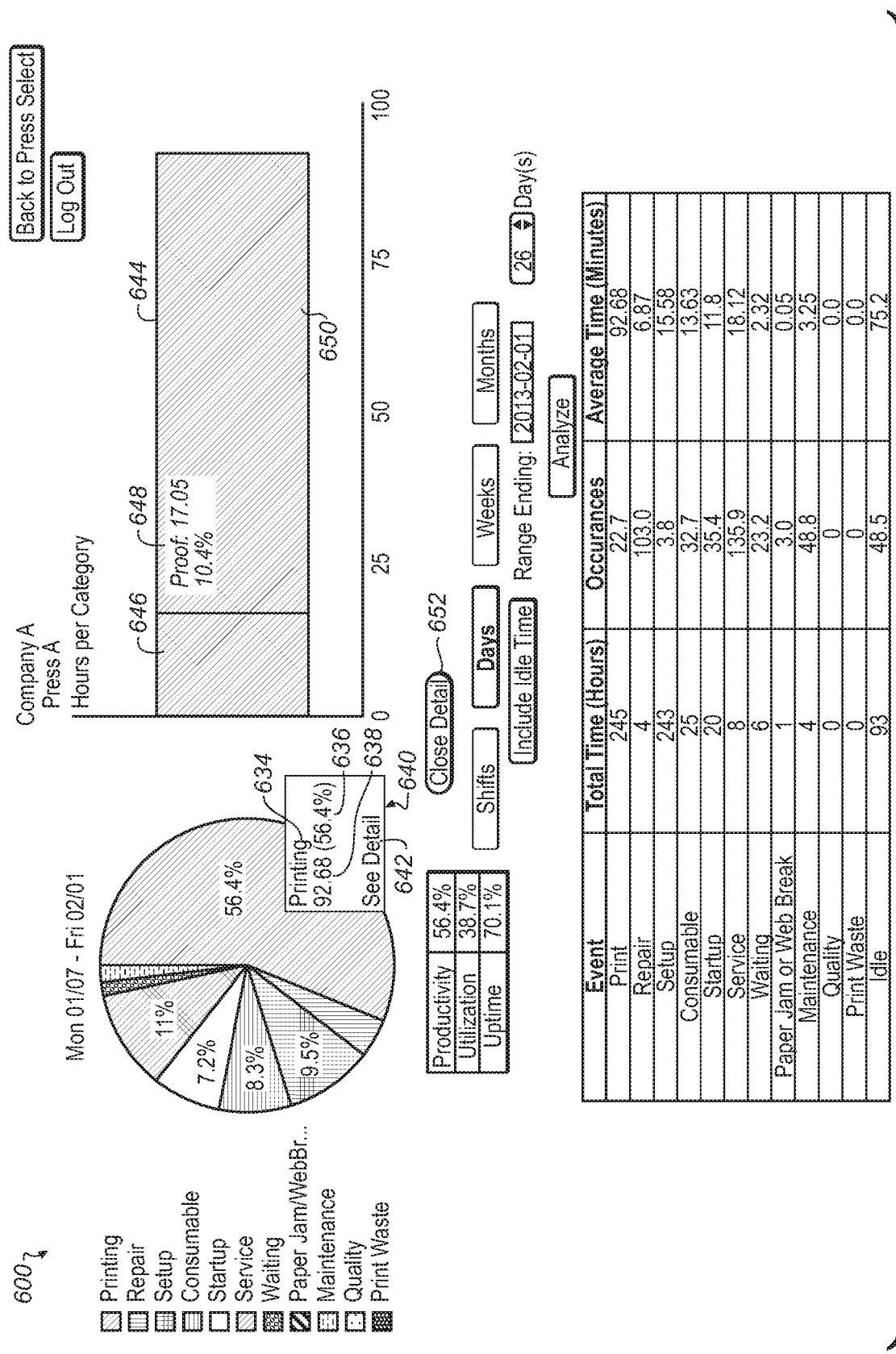
FIG. 6B illustrates the results screen of FIG. 6A in a selected-event-category detail mode, according to some embodiments of the present invention.

In some embodiments, some of which are shown, for example, in FIG. 6B, when a mouse pointer hovers over a slice of the pie 606, or a slice of the pie 606 is otherwise selected (e.g., by a mouse click, a key stroke or strokes, a finger tap on a touch screen, etc.), the name of the event category 634, the percentage 636 of the pie occupied by that event category, a total time 638 spent on that event category over the period of time 608, other information, or a combination thereof may be displayed in a pop-up window 640 or otherwise revealed in a manner responsive to the user-selection of the event category. In some embodiment, the other information presented in the pop-up window 640 is a "See Detail" selection item 642 that, when selected by a user, e.g., by a mouse click or a finger tap, causes the display of additional information relating to the selected event category, which in the case of FIG. 6B, is the Printing event category indicated by bar-chart region 650. An example of this additional information is described below, after the description of the vertical bar chart 612.

The vertical bar chart 612, in the example of FIG. 6A, illustrates the number of hours spent per day over the time period 608 on each of the event categories 604. In the example of FIG. 6A, the bar chart 612 is divided on a day-by-day basis due to a selection of the "days" option 613. However, the user 222 may selectively change the bar chart 612 to be divided on a shift, week, or month basis via selection of the respective options at display region 614. It should be noted, however, that the invention is not limited to any particular divisions of time, and that those shown in FIG. 6A are merely for illustrative purposes only.

As described above, additional information relating to a selected event category may be displayed, in some embodiments. For instance, in some embodiments illustrated in FIG. 6B, when a user selects the "See Detail" selection item 642, a detail display mode of the user interface 600 is entered, where the bar chart 612 changes to a horizontal bar chart 644. It should be noted, however, that the present invention is not limited to including a horizontal bar chart to display the additional information relating to a selected event category, and any manner of displaying such additional information may be used.

The horizontal bar chart 644 may illustrate the time spent on each individual event or activity (or in some embodiments, each sub-event-category) that is included in the selected event category (e.g., 634). In the example of FIG. 6B, the horizontal bar chart 644 indicates that 10.4% of the printing event category 634, or 17.05 hours, was spent on printing proofs, pursuant to bar-chart region 646 and pop-up window 648, which indicate a "Proof" sub-event category of the printing event category 634. The rest of the time in the printing event category 634 was spent on a production printing sub-event category of the printing event category 634, as indicated by bar-chart region 650 in the horizontal bar chart 644. In some embodiments, the detail display mode (e.g., FIG. 6B) of the user interface 600 is exited by selection of a "Close Detail" software button 652, which returns the user interface 600 to the previous or first mode illustrated in FIG. 6A, for example. However, the present invention is not limited to any particular technique of switching from the selected-event-detail-mode (e.g., FIG. 6B) and the non-selected-event-detail-mode (e.g., FIG. 6A), or vice versa.

Results of analyzing additional production-based metrics may be shown in a table in screen region 626, for example below the graphs 606, 612. These results may include the total time spent in each event category, the number of times an event in each event category happened, and the corresponding average duration of each event within each event category, within the overall selected period 608, 610. Since the system (e.g., system 200) may track different event categories (such as Consumable change) and activity-specific auxiliary information (such as type of Consumable, Impression Number), the server device system 210 may also calculate and the frequency of consumable changes, yield or life of the specific consumable, etc., for display on a results screen. Similar tracking may also be performed on other event categories such as Repair, Service, Maintenance, etc. to be able to calculate and display the frequency of category specific issues. This tracking may be expanded to display such information for specific activities within categories. Such information may be useful to pinpoint common time-consuming activities that reduce productivity.

The time period 608, 610 may be defined by the user 222 via, for example, the date and duration options 616. If a change is made to the time period 608, 610, the user 222 can cause the server device system 210 to recalculate the values of the production-based metrics and update the results screen 600 by selecting the "Analyze" button 618. However, to be noted that such button 618 is not required, and the values of the production-based metrics can be recalculated and the results screen 600 updated in response to a change in any one of the options at 614, 616, 620.

In this regard, the results screen 600 or any results screen (e.g., 224 or 800) of any of the other various embodiments of the present invention may be updated in response to occurrence of a condition or a plurality of conditions. In some embodiments, the results screen is updated while it is being displayed in response to occurrence of a condition of the plurality of conditions. The plurality of conditions may include a receiving of new operator input via the terminal device 216 or via a data acquisition device 202. In this regard, the results screen may be updated, e.g., while it is being displayed, to reflect the new operator input. In some embodiments, the plurality of conditions may include a change in a state associated with an output-producing asset for which a value of a production-based metric is being viewed on the results screen, such that the results screen is updated in some way to indicate the change in state, e.g., by way of a notification or message. The change in the state may be a change to an abnormal state associated with such output-producing asset, such that, e.g., the results screen may be updated to include an error message indicating the abnormal state. In some embodiments, the plurality of conditions may include the receipt of a request to update the results, e.g., by way of the "Analyze" button 618.

According to some embodiments illustrated with respect to FIG. 7, values of production-based metrics are generated to compare the production of different output-producing assets or different operators. In this regard, FIG. 7 illustrates the processor accessible memory device system 212 storing operator input 208 indicating a plurality of events encompassing "A"-"H", where each of "A"-"H" illustrates a subset of the plurality of events. Likewise, each of "A"-"H" may illustrates a subset of operator input 208. However, the events represented by "A"-"H" may have asset input 214 interspersed therein, according to some embodiments, so each of "A"-"H" need not precisely correspond with a respective subset of operator input 208 and, instead, operator input 208 may be interspersed throughout "A"-"H". For clarity of explanation, however, it will be assumed that each of "A"-"H" corresponds to a respective subset of operator input 208. In this regard, block "A" in FIG. 7 may be considered a subset of operator input 208 (e.g., "first operator input"), block "B" may be considered another subset of operator input 208 (e.g., "second operator input"), etc. However, unless explicitly noted or required by context, the labels 'first', 'second', etc. are not intended to require a time-order sequence and, instead, are merely intended to identify potentially different objects or sets of objects (e.g., operator input). For instance, "first operator input" is not necessarily before "second operator input" and may be produced after the "second operator input" in some embodiments.

In the example of FIG. 7, subset "A" of the events in the example of FIG. 7 corresponds to the subset "A" of events 402 illustrated in FIG. 4. In this regard, the subset "A" of the events illustrated in FIG. 7 represents a subset of events associated with a first output-producing asset, a first operator, and a first time period (e.g., calendar period or operator shift). Further in this regard, subsets "A"-"D" are all associated with the first output-producing asset, but are associated with respectively subsequent time periods. For example, subset "A" is associated with a first time period, subset "B" is associated with a second time period (e.g., calendar period or operator shift) after the first time period, subset "C" is associated with a third time period (e.g., calendar period or operator shift) after the second time period, and a subset "D" is associated with a fourth time period (e.g., calendar period or operator shift) after the third time period.

Similarly, subsets "E"-"H" are all associated with a second output-producing asset other than the first output-producing asset. In addition, for the purposes of providing a simple example, the subsets "E"-"H" are respectively associated with the same time periods as subsets "A"-"D", although this need not be the case in practice. In this regard, in the example of FIG. 7, subset "E" is associated with the same first time period as subset "A", subset "F" is associated with the same second time period as subset "B", and so on.

Accordingly, in the example of FIG. 7, blocks "A"-"D" may be considered a subset of operator input 208 (e.g., "first operator input") or a first plurality of events associated with a first output-producing asset, and blocks "E"-"H" may be considered another subset of operator input (e.g., "second operator input") or a second plurality of events associated with a second output-producing asset. While it has been discussed above that block "A" may be considered "first operator input" and block "B" may be considered "second operator input", the overlapping use of the phrases "first operator input" and "second operator input" is intended merely to show that such phrases can be arbitrarily assigned to any respective subset of operator input 208. A corresponding approach may be applied to asset input 214 or to any input to the server device system 210 including a combination of operator input 208 and asset input 214.

In embodiments where each data acquisition device 202 is assigned to acquire operator input for a particular output-producing asset, subsets "A"-"D" may be considered to all be associated with a first data acquisition device, while the subsets "E"-"H" may be considered to be associated with a second data acquisition device. In other words, in some embodiments, a first data acquisition device may acquire or receive first operator input including the information associated with subsets "A"-"D", and a second data acquisition device may acquire or receive second operator input including the information associated with subsets "E"-"H". In this regard, in some embodiments, the first data acquisition device may transmit such first operator input to the server device system 210, so that the server device system 210 receives such first operator input, and the second data acquisition device may transmit such second operator input to the server device system 210, so that the server device system 210 receives such second operator input.

Further, in the example of FIG. 7, subset "A" and subset "C" are associated with input provided by a first operator. Subset "B" and subset "D" are associated with input provided by a second operator other than the first operator. Accordingly, blocks "A" and "C" may be considered first operator input or a first plurality of events associated with a first operator, and the blocks "B" and "D" may be considered second operator input or a second plurality of events associated with a second operator different than the first operator. On the other hand, block "A" may be considered first operator input or a first plurality of events associated with a first or particular operator, and block "C" may be considered second operator input or a second plurality of events associated with the same first operator.

Subset "E" and subset "G" are associated with a third operator other than the first and second operators, and subset "F" and subset "H" are associated with a fourth operator other than the first, second, and third operators.

In some embodiments, at least in order to compare production-based metrics of at least two different output-producing assets (e.g., the first output-producing asset and the second output-producing asset in FIG. 7), the server device system 210 is configured to generate at least a first value of a production-based metric for the first output-producing asset based at least upon an analysis of the subsets "A"-"D" of events. In addition, the server device system 210 is configured to generate at least a second value of the production-based metric for the second output-producing asset based at least upon an analysis of the subsets "E"-"H" of the events. With at least these first and second values of the same production-based metric, a comparative results screen (e.g., 224) may be displayed comparing the first and second output-producing assets.

Figure 8A:
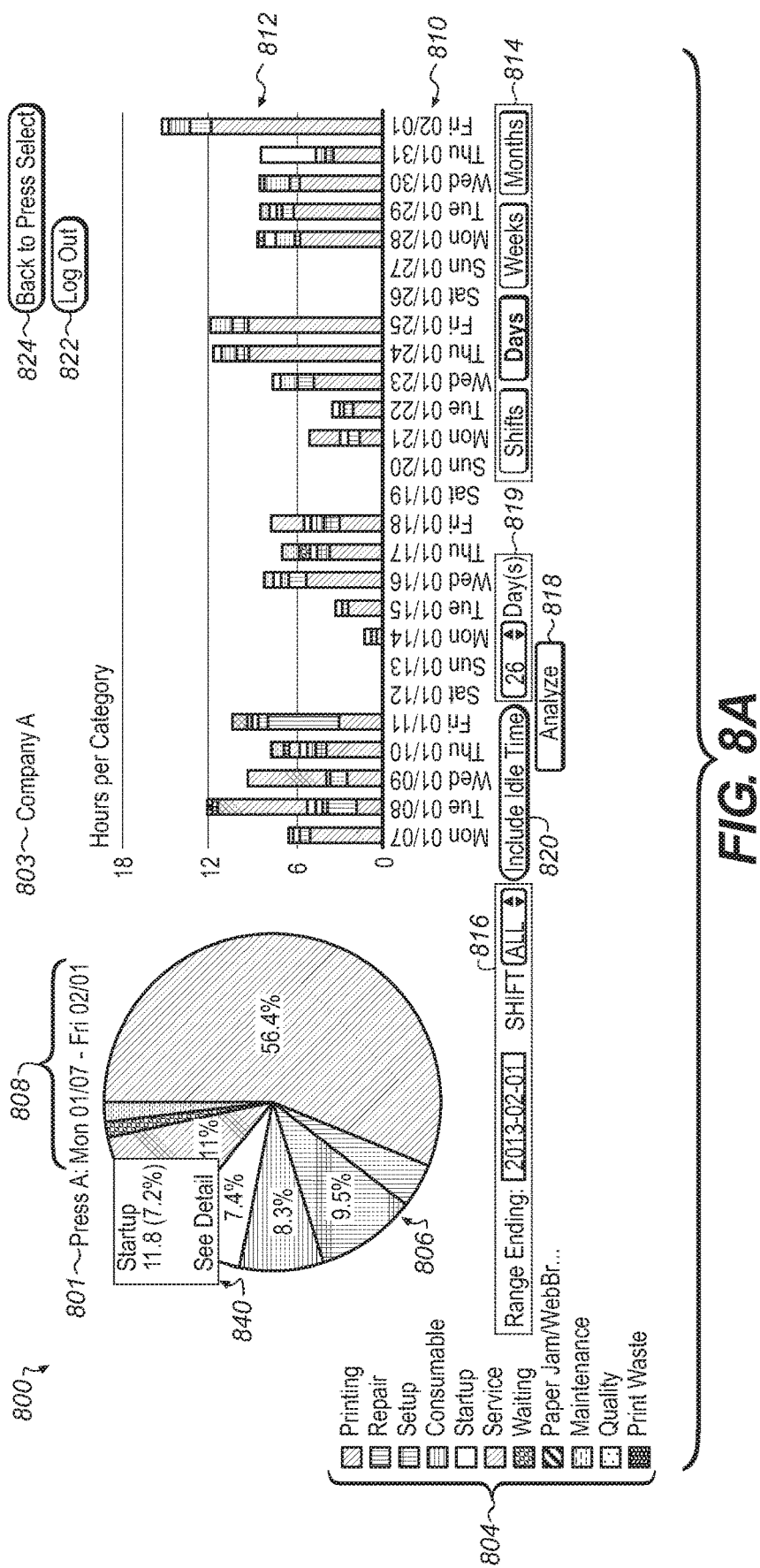
Figure 8B:
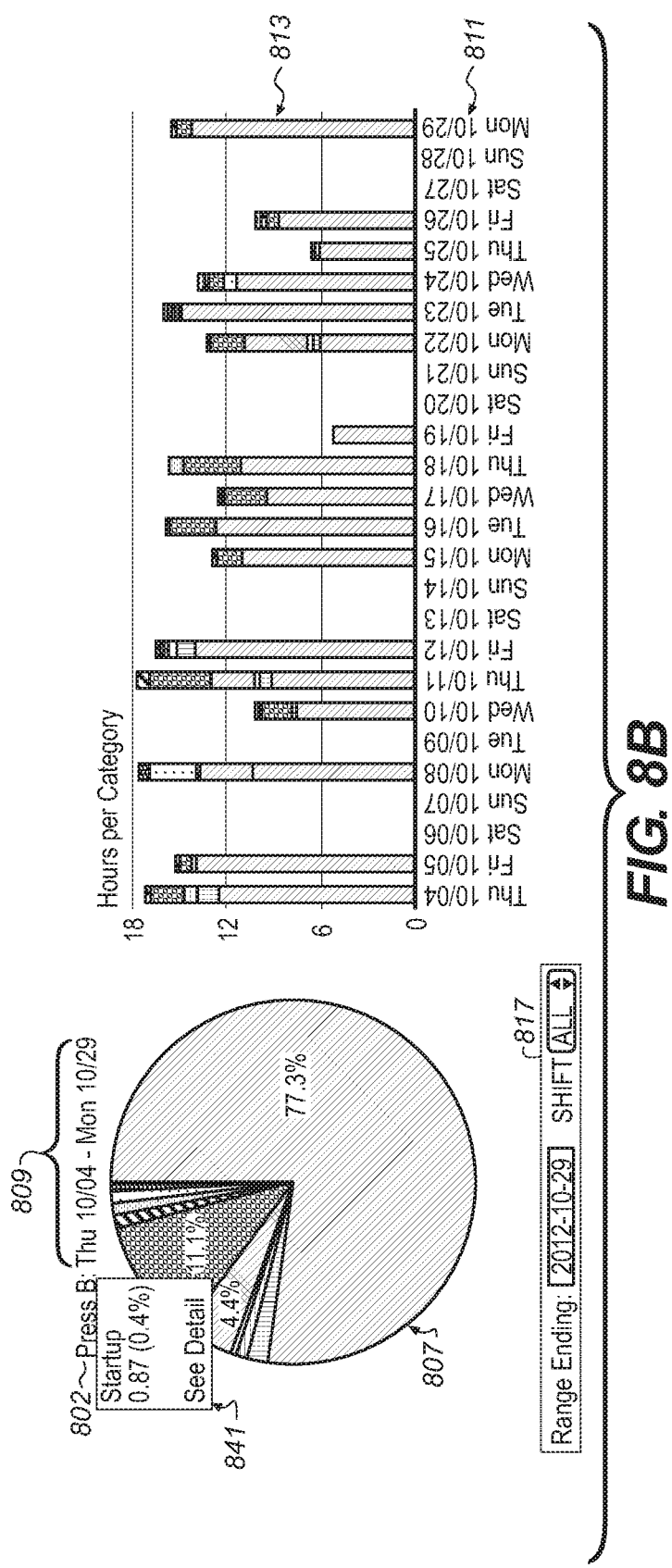

FIGS. 8A-8C illustrate an example of such a comparative results screen 800, which compares the production of two different output-producing assets 801, 802 belonging to a same organization 803. However, it should be noted that more than two output-producing assets or multiple organizations or locations where output-producing assets reside may be compared. In some embodiments, all of FIGS. 8A-8C may be displayed as a single results screen, where a user may scroll the results screen down from FIG. 8A to FIG. 8B to FIG. 8C, and back up again as needed, depending upon available screen real-estate.

According to some embodiments, the comparative results screen 800 includes features corresponding to those discussed above with respect to FIGS. 6A and 6B. For example, output-producing asset selection button 824 and log out button 822 correspond to buttons 624 and 622, respectively. In addition, FIG. 8 illustrates event categories 804 like event categories 604 in FIG. 6A, although the categories in event categories 804 may be different than those in event categories 604, according to some embodiments. Accordingly, it should be noted that that the particular event categories included in a results screen 600, 800 can vary and may be user-defined. Further, FIG. 8 includes a pie chart 806 and a bar chart 812 for the first output-producing asset 801, like the pie chart 606 and bar chart 612 in FIG. 6A for the output-producing asset 602. FIG. 8 also includes a pie chart 807 and a bar chart 813 for the second output-producing asset 802, like the pie chart 606 and bar chart 612 in FIG. 6A for the output-producing asset 602. Although not shown with respect to FIG. 8, the results screen 800 may include the selected-event-category detail mode corresponding to, for example, FIG. 6B for any selection of an event category in any one of the charts 806, 807, 812, 813 shown in FIG. 8, as illustrated, in part, e.g., by pop-up windows 840 and 841.

Also similarly, FIG. 8 includes a user-definable first time period 808, 810 associated with the first output-producing asset 801, like the time period 608, 610. In addition, FIG. 8 includes a second user-definable time period 809, 811 associated with the second output-producing asset 802, like the time period 608, 610 in FIG. 6A. In the example of FIG. 8, the first time period 808, 810 is different than the second time period 809, 811. Accordingly, it can be seen that the time periods in comparison results screens like results screen 800 may be different, although they may alternatively be the same. The first time period 808 may be user-adjusted via the options at screen region 816, 819, while the second time period 809 may be user-adjusted via the options at screen region 817, 819. The time period divisions of the bar charts 812, 813 may be user-defined via the options at screen region 814. "Analyze" Button 818 may have the same functionality as the "Analyze" button 618 in FIG. 6A, and "Include Idle Time" button 820 may have the same functionality as the "Include Idle Time" button 620 in FIG. 6A.

Further, the example user interface 800 of FIG. 8 may include display of the Productivity, Utilization, and Uptime production-based metrics 828, 830, 832, respectively, as does the user interface 600 of FIG. 6A at reference numerals 628, 630, 632, respectively. However, the user interface 800 of FIG. 8 may display such metrics 828, 830, 832 in a comparison mode, where the values of the respective metrics associated with the first output-producing asset 801 and the values of the respective metrics associated with the second output-producing asset 802 are displayed, possibly adjacent or proximate each other. Similarly, the example user interface 800 of FIG. 8 may include a table 826 like table 626 in the user interface 600 of FIG. 6A, but in a comparison mode, where the values of the respective metrics associated with the first output-producing asset 801 and the values of the respective metrics associated with the second output-producing asset 802 are displayed, possibly adjacent or proximate each other.

Returning to FIG. 7, some embodiments of the present invention allow production comparison between at least two different operators. For example, the server device system 210 may be configured to generate a first value of a production-based metric based at least upon an analysis of the subsets "A" and "C" of events associated with the first operator. In addition, the server device system 210 may be configured to generate a second value of the production-based metric based at least upon an analysis of the subsets "B" and "D" of events associated with the second operator. With these first and second values, a comparison results screen similar to that illustrated with FIG. 8 may be generated for display, for example, at a terminal device 216 to compare the production of the first and second operator.

Another comparison option is to compare production between different time periods. These different time periods may be associated with a same output-producing asset or different output-producing assets. These different time periods may be associated with different shifts over the same or different calendar times. These different time periods may be associated with a same operator or different operators. FIG. 7 illustrates an example where the different time periods are associated with a same operator. For instance, the server device system 210 may be configured to generate a first value of a production-based metric based at least upon an analysis of the subset "A" of the events, which is associated with the first operator and the first time period. In addition, the server device system 210 may be configured to generate a second value of the production-based metric based at least upon an analysis of the subset "C" of the events, which also is associated with the first operator, but is associated with the third time period. With these first and second values, a comparison results screen similar to that illustrated with FIG. 8 may be generated for display, for example, at a terminal device 216, to compare the production of the first operator over the first and third time periods.

Figure 9:
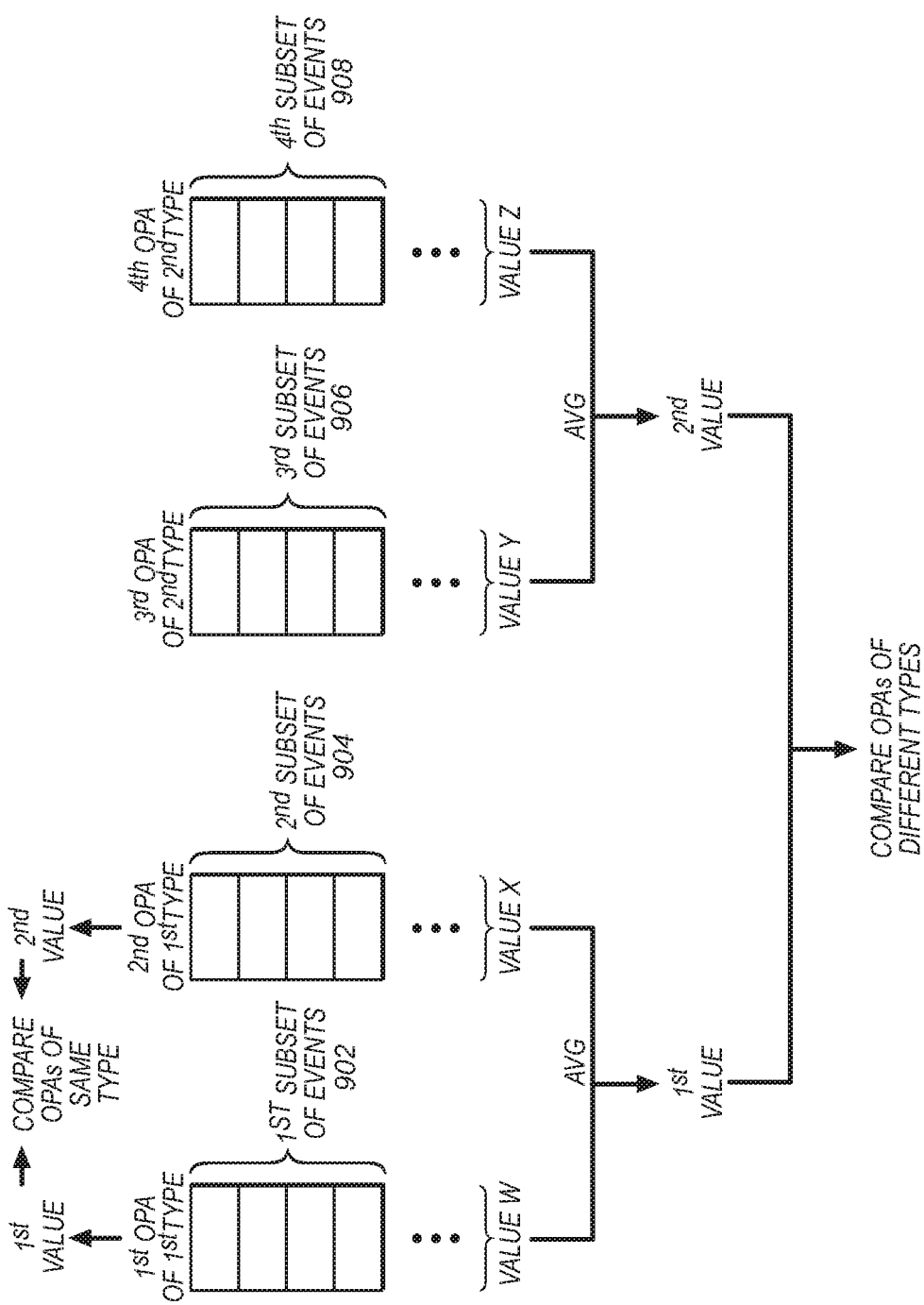
FIG. 9 illustrates the generation of values of at least one production-based metric for comparing output-producing assets of a same type or of different types, according to some embodiments of the present invention.

In view of the above discussion, it can be seen that the present invention is not limited to any particular combination of comparison objects. In this regard, FIG. 9 illustrates still further examples where output-producing assets of a same type are compared or output-producing assets of different types are compared. In FIG. 9, a first subset of events 902 is associated with a first output-producing asset of a first type, a subset of events 904 is associated with a second output-producing asset of the first type, a third subset of events 906 is associated with a third output-producing asset of a second type, and a fourth subset of offense 908 is associated with a fourth output-producing asset of the second type. It should be noted that each of the event subsets 902, 904, 906, 908 may include operator-generated input, output-producing-asset-generated input, or both.

The first type and the second type may indicate different manufacturers or different models of an output-producing asset. However, in some embodiments, the first type and the second type may indicate a same manufacturer and model of output-producing asset, but may indicate different locations or different organizations to which an output-producing asset belongs. For example, the first type in FIG. 9 may indicate that the first output-producing asset and the second output-producing asset are from one company or geographic region, second type may indicate that the third output-producing asset and the fourth output-producing asset are from a second company or geographic region different than the first region.

In some embodiments, in order to compare output-producing assets of a same type, the server device system 210 may be configured to generate a first value of a production-based metric based at least upon an analysis of the first subset of events 902. In addition, the server device system 210 may be configured to generate a second value of the production-based metric based at least upon an analysis of the second subset of events 904. With these first and second values, a comparison results screen similar to that illustrated with FIG. 8 may be generated for display, for example, at a terminal device 216, to compare the production of multiple output-producing assets of the same type.

In some embodiments, as illustrated in FIG. 9, in order to compare output-producing assets of different types, the server device system 210 may be configured to generate a value "W" of a production-based metric based at least upon an analysis of the first subset of events 902 and to generate a value "X" of the production-based metric based at least upon an analysis of the second subset of events 904. Similarly, the server device system 210 may be configured to generate a value "Y" of the production-based metric based at least upon an analysis of the third subset of events 906 and to generate a value "Z" of the production-based metric based at least upon an analysis of the fourth subset of events 908. The server device system 210 may be configured to combine the values "W" and "X" associated with the output-producing assets of the first type, such as by taking an average, in order to generate a first value of the production-based metric. Similarly, the server device system 210 may be configured to combine the values "Y" and "Z" associated with the output-producing assets of the second type, such as by taking an average, in order to generate a second value of the production-based metric. With these first and second values, a comparison results screen similar to that illustrated with FIG. 8 may be generated for display, for example, at a terminal device 216, to compare the production of multiple output-producing assets of different types.

Figure 10:
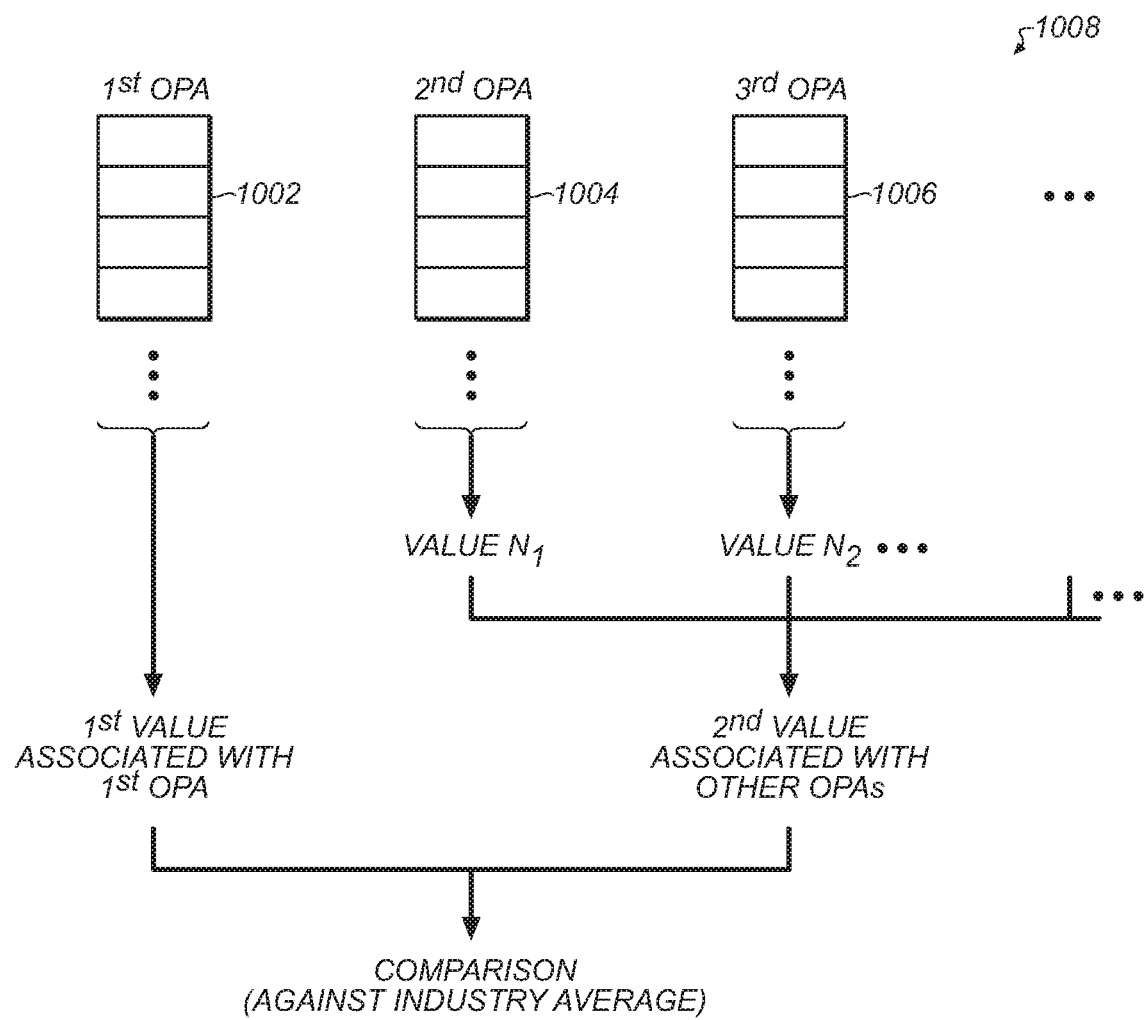
FIG. 10 illustrates the generation of values of at least one production-based metric for comparing one output-producing asset to multiple output-producing assets, according to some embodiments of the present invention.

FIG. 10 illustrates the generation of values of a production-based metric for the comparison of one output-producing asset against many other output-producing assets. These embodiments may be beneficial for comparing the production of an output-producing asset against, for example, an industry average.

In FIG. 10, a first subset of events 1002 is associated with a first output-producing asset. A second subset of events 1004 is associated with a second output-producing asset, and a third subset of events 1006 is associated with a third output-producing asset. In ellipses 1008 is shown to illustrate that there may be additional other output-producing assets besides the second and third output-producing assets.

In order to compare the production of the first output-producing asset against each of the other output-producing assets (e.g., the second output-producing asset, the third output-producing asset, and any other additional output-producing assets), the server device system 210 may be configured to generate a first value of a production-based metric based at least upon an analysis of the first subset of events 1002. This first value is associated with the first output-producing asset. In addition, the server device system 210 may be configured to generate a value "$N_1$" of the production-based metric based at least upon an analysis of the second subset of events 1004 associated with the second output-producing asset. The server device system 210 may be configured to generate a value "$N_2$" of the production-based metric based at least upon an analysis of the third subset of events 1006 associated with the third output-producing asset. Additional values "$N_n$" may be generated for each additional other output-producing asset beyond the third output-producing asset in the same manner.

In this regard, the server device system 210 may be configured to generate a second value of the production-based metric by combining each of the values "$N_1$", "$N_2$" "$N_n$", for example, by taking an average of such values. With these first and second values, a comparison results screen similar to that illustrated with FIG. 8 may be generated for display, for example, at a terminal device 216, to compare the production of the first output-producing asset against multiple other output-producing assets.

In some embodiments, all of the output-producing assets in FIG. 10 are of a same type. However, this need not be the case. For example, the first output-producing asset may be of one type, while each of the other output-producing assets (e.g., the second output-producing asset, the third output-producing asset, etc.) may be of another type. However, the present invention is not limited to any combination of output-producing asset types.

In some embodiments, operator incentives are provided. For example, the server device system 210 may provide an indication to an operator 208 of a reward in response to achievement of a threshold amount of a usage-based parameter. For example, if the operator 208 uses the user-interface 203 a threshold amount of time, the operator 208 achieves a certain percentage of Actual Production Time with an output-producing asset 206, or the operator 208 successfully records a threshold amount of operator input 208 for a threshold number of operator shifts, the operator 208 may be provided with a financial reward, a symbolic reward, or some other reward, and the server device system 210 may transmit a notification to some device in the system 200 indicating that the award has been achieved. Similarly, the user or manager 222 may be eligible for rewards, according to some embodiments of the present invention. For example, if a new (or second) value of a production-based metric improves by a threshold amount over a previous (or first) value of the production-based metric (e.g., average Actual Production Time for all output-producing assets increase by more than X %), the user or manager 222 may be provided with a financial reward, a symbolic reward, or some other reward, and the server device system 210 may transmit a notification to some device in the system 200 indicating that the award has been achieved.

Subsets or combinations of various embodiments described above provide further embodiments. These and other changes can be made to the invention in light of the above-detailed description and still fall within the scope of the present invention. In general, in the following claims, the terms used should not be construed to limit the invention to the specific embodiments disclosed in the specification and the claims. Accordingly, the invention is not limited by the disclosure, but instead its scope is to be determined entirely by the following claims.

What is claimed is:

1. An output-producing asset productivity evaluation device system comprising:
    a first data processing device system;
    a first input-output device system communicatively connected to the first data processing device system and including a first display device system; and
    a first processor-accessible memory device system communicatively connected to the first data processing device system and storing a first program set executable by the first data processing device system,
    wherein the first data processing device system is configured at least by the first program set at least to:
        access, via the first input-output device system, first asset input indicating occurrence of a non-operational event in which a first output-producing asset was not operational;
        cause storage of information about the occurrence of the non-operational event, including time and an identification of the first output-producing asset with an associated first particular software key of a plurality of software keys;
        cause the first display device system to visually present a user interface linked to the first output-producing asset, the user interface including the plurality of software keys, each software key of the plurality of software keys associated with providing an event description;
        receive a user-selection of the first particular software key of the plurality of software keys, the first particular software key associated with providing a particular event description;
        associate, with the non-operational event in which the first output-producing asset was not operational, information pertaining to the particular event description at least in response to receiving the user-selection of the first particular software key;
        cause storage, in a processor-accessible memory device system, of output-producing asset productivity information based at least on the information pertaining to the particular event description associated with the non-operational event in which the first output-producing asset was not operational;
        facilitate log in of a first operator indicating operation of the first output-producing asset by the first operator;
        link, in a state in which the first operator is logged in, the user interface to the logged-in first operator and the first output-producing asset, including associating each software key of the plurality of software keys with one or more events associated with both the logged-in first operator and the first output-producing asset;
        facilitate log in of a second operator different than the first operator indicating operation of the first output-producing asset by the second operator;
        link, in a state in which the second operator is logged in, the user interface to the logged-in second operator and the first output-producing asset, including associating each software key of the plurality of software keys with one or more events associated with both the logged-in second operator and the first output-producing asset;
        receive, in the state in which the first operator is logged in, an instruction from the logged-in first operator to associate the user interface with a second output-producing asset other than the first output-producing asset; and
        link, in response to receiving the instruction and in the state in which the first operator is logged in, the user interface to the logged-in first operator and the second output-producing asset other than the first output-producing asset, including associating each software key of the plurality of software keys with one or more events associated with both the logged-in first operator and the second output-producing asset.

2. The output-producing asset productivity evaluation device system of claim 1, wherein the causing of storage of the output-producing asset productivity information includes causing storage of the output-producing asset productivity information in a data structure that includes a sequence of events in which the first output-producing asset is operational and non-operational, each event of at least some events in the sequence of events including missing information about the event.

3. The output-producing asset productivity evaluation device system of claim 1, wherein the first data processing device system is configured at least by the first program set at least to:
    receive, via user-selection of the first particular software key in the state in which the first operator is logged in, first operator input indicating auxiliary information about the non-operational event in which the first output-producing asset was not operational, the auxiliary information providing information about the non-operational event that is unavailable to the first output-producing asset and, consequently, is not included in the first asset input; and cause storage of the first operator input indicating the auxiliary information in association with an indication of the non-operational event in which the first output-producing asset was not operational.

4. The output-producing asset productivity evaluation device system of claim 1, further comprising:

a server device system communicatively connected to the first data processing device system and the first output-producing asset, the server device system comprising a second data processing device system, a second input-output device system communicatively connected to the second data processing device system, and a second processor-accessible memory device system communicatively connected to the second data processing device system and storing a second program set executable by the second data processing device system, wherein the first data processing device system is configured at least by the first program set at least to transmit, to the server device system via the first input-output device system, the information pertaining to the particular event description associated with the non-operational event in which the first output-producing asset was not operational, and wherein the server device system is configured at least by the second program set at least to:

receive, from the first data processing device system via the second input-output device system, the information pertaining to the particular event description associated with the non-operational event in which the first output-producing asset was not operational; and store, in a database, the received information pertaining to the particular event description in association with the non-operational event in which the first output-producing asset was not operational.

5. The output-producing asset productivity evaluation device system of claim 4, wherein the server device system is configured at least by the second program set at least to:

generate a first set of values of at least a first production-based metric associated with production by the first output-producing asset based at least on the received information, stored in the database, pertaining to the particular event description associated with the non-operational event in which the first output-producing asset was not operational; and cause a display device system to display a first graphical representation of productivity information indicating productivity of the first output-producing asset based at least on the generated first set of values of the at least the first production-based metric.

6. The output-producing asset productivity evaluation device system of claim 5, wherein the server device system is communicatively connected to the first data processing device system, the first output-producing asset, and the second output-producing asset, wherein the server device system is configured at least by the second program set at least to:

receive, via the second input-output device system, second information pertaining to an event occurrence at the second output-producing asset; and store, in the database, the received second information pertaining to the event occurrence at the second output-producing asset.

7. The output-producing asset productivity evaluation device system of claim 6, wherein the server device system is configured at least by the second program set at least to:

generate a second set of values of at least the first production-based metric associated with production by the second output-producing asset based at least on the received second information, stored in the database, pertaining to the event occurrence at the second output-producing asset; and cause the display device system to display a second graphical representation of comparison information comparing productivity of the first output-producing asset to productivity of the second output-producing asset, based at least on the generated first set of values of the at least the first production-based metric and the generated second set of values of the at least the first production-based metric.

* * * * *